(12) United States Patent
Yen

(10) Patent No.: US 12,161,942 B2
(45) Date of Patent: Dec. 10, 2024

(54) VIDEOGAME TELEMETRY DATA AND GAME ASSET TRACKER FOR SESSION RECORDINGS

(71) Applicant: Electronic Arts Inc., Redwood City, CA (US)

(72) Inventor: Grace Yen, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/508,016

(22) Filed: Nov. 13, 2023

(65) Prior Publication Data

US 2024/0189724 A1   Jun. 13, 2024

Related U.S. Application Data

(63) Continuation of application No. 17/455,858, filed on Nov. 19, 2021, now Pat. No. 11,813,538, which is a continuation of application No. 16/834,663, filed on Mar. 30, 2020, now Pat. No. 11,179,644.

(51) Int. Cl.
   *A63F 13/86* (2014.01)
   *A63F 13/53* (2014.01)

(52) U.S. Cl.
   CPC ............. *A63F 13/86* (2014.09); *A63F 13/53* (2014.09)

(58) Field of Classification Search
   CPC ....................................................... A63F 13/86
   See application file for complete search history.

(56) References Cited

U.S. PATENT DOCUMENTS

| | | |
|---|---|---|
| 8,719,791 B1 | 5/2014 | MacPherson et al. |
| 8,997,061 B1 | 3/2015 | Davison |
| 9,009,539 B1 | 4/2015 | Kompotis et al. |
| 9,245,117 B2 | 1/2016 | Weaver et al. |

(Continued)

OTHER PUBLICATIONS

Borovikov, et al., From Demonstrations and Knowledge Engineering to a DNN Agent in a Modern Open-World Video Game, Presentation Slides, 2019.

(Continued)

*Primary Examiner* — Reginald A Renwick
(74) *Attorney, Agent, or Firm* — Knobbe, Martens, Olson & Bear, LLP

(57) ABSTRACT

Disclosed are issue tracking systems, troubleshooting techniques, and user interfaces for troubleshooting, which are associated with a user of a software application triggering the recording of a session. During the session, the user may narrate suggestions or problems for the application while they interact with the application in real-time, and a recording engine of the application may record various types of session data, such as the user's interaction, narration, telemetry data, call stack data, and so forth. The session data is automatically submitted to an issue tracking system to process a support ticket. The issue tracking system may provide a user interface enabling a developer to review a support ticket and any associated session data to quickly determine the relevant portion of the application data (e.g., underlying program code) that needs to be modified. The issue tracking system may also process session data to identify related tickets or recurring issues.

20 Claims, 12 Drawing Sheets

(56) References Cited

U.S. PATENT DOCUMENTS

| | | | |
|---|---|---|---|
| 9,898,391 | B1 | 2/2018 | Morice et al. |
| 10,282,280 | B1 | 5/2019 | Gouskova et al. |
| 10,286,323 | B2 | 5/2019 | Aghdaie et al. |
| 10,848,805 | B1* | 11/2020 | Mattar ............. H04N 21/47202 |
| 10,891,219 | B1 | 1/2021 | Dimitropoulos et al. |
| 10,940,393 | B2 | 3/2021 | Somers et al. |
| 10,949,325 | B1 | 3/2021 | Culibrk et al. |
| 11,179,644 | B2 | 11/2021 | Yen |
| 11,250,617 | B1 | 2/2022 | Sempe et al. |
| 11,446,570 | B2 | 9/2022 | Borovikov et al. |
| 2003/0005044 | A1 | 1/2003 | Miller et al. |
| 2003/0177187 | A1 | 9/2003 | Levine et al. |
| 2005/0138104 | A1 | 6/2005 | Houh et al. |
| 2005/0166115 | A1 | 7/2005 | Daume et al. |
| 2006/0046854 | A1* | 3/2006 | Arevalo Baeza ....... A63F 13/12 463/42 |
| 2006/0253741 | A1 | 11/2006 | Garakani |
| 2007/0233497 | A1 | 10/2007 | Paek et al. |
| 2009/0027402 | A1 | 1/2009 | Bakalash et al. |
| 2009/0070746 | A1 | 3/2009 | Dhurjati et al. |
| 2009/0113251 | A1 | 4/2009 | Goossen et al. |
| 2009/0113303 | A1 | 4/2009 | Goossen et al. |
| 2009/0270178 | A1* | 10/2009 | Pallett-Plowright .... A63F 13/12 463/43 |
| 2010/0115496 | A1 | 5/2010 | Amichai |
| 2010/0144443 | A1 | 6/2010 | Graham |
| 2010/0144444 | A1 | 6/2010 | Graham |
| 2012/0204153 | A1 | 8/2012 | Peterson et al. |
| 2012/0209571 | A1 | 8/2012 | Peterson et al. |
| 2012/0311387 | A1 | 12/2012 | Santhosh et al. |
| 2013/0205286 | A1 | 8/2013 | Barraclough et al. |
| 2014/0085314 | A1 | 3/2014 | Steinke |
| 2014/0300491 | A1 | 10/2014 | Chen |
| 2015/0375101 | A1 | 12/2015 | George |
| 2015/0375102 | A1 | 12/2015 | George |
| 2015/0375103 | A1 | 12/2015 | George |
| 2016/0041894 | A1 | 2/2016 | Reid, III et al. |
| 2016/0179659 | A1 | 6/2016 | Champlin-Scharff et al. |
| 2016/0262680 | A1 | 9/2016 | Martucci et al. |
| 2016/0283353 | A1 | 9/2016 | Owen et al. |
| 2016/0292065 | A1 | 10/2016 | Thangamani et al. |
| 2017/0123961 | A1 | 5/2017 | Cerny et al. |
| 2017/0147470 | A1 | 5/2017 | Bloching et al. |
| 2017/0201779 | A1 | 7/2017 | Publicover et al. |
| 2017/0230417 | A1 | 8/2017 | Amar et al. |
| 2017/0242780 | A1 | 8/2017 | Arbel |
| 2017/0259177 | A1 | 9/2017 | Aghdaie et al. |
| 2017/0322917 | A1 | 11/2017 | Goyal et al. |
| 2017/0339037 | A1 | 11/2017 | Cheh et al. |
| 2018/0050273 | A1 | 2/2018 | Garoufalis et al. |
| 2018/0165723 | A1 | 6/2018 | Wright et al. |
| 2018/0275989 | A1 | 9/2018 | Kakkad et al. |
| 2018/0293158 | A1 | 10/2018 | Baughman et al. |
| 2020/0089594 | A1 | 3/2020 | Zhou et al. |
| 2020/0159644 | A1 | 5/2020 | Beltran et al. |
| 2020/0334228 | A1 | 10/2020 | Matyska et al. |
| 2021/0366183 | A1 | 11/2021 | Gisslen et al. |
| 2022/0152516 | A1 | 5/2022 | Yen |
| 2022/0305386 | A1 | 9/2022 | Gisslen et al. |
| 2023/0009378 | A1 | 1/2023 | Borovikov et al. |

OTHER PUBLICATIONS

Borovikov, et al., From Demonstrations and Knowledge Engineering to a DNN Agent in a Modern Open-World Video Game, Published Apr. 26, 2019.

Borovikov, et al., Imitation Learning via Bootstrapped Demonstrations in an Open-World Video Game, Dec. 2018.

Borovikov, et al., Towards a Representative Metric of Behavior Style in Imitation and Reinforcement Learning, 23rd Annual Signal and Image Sciences Workshop at Lawrence Livermore National Laboratory (LLNL), Center for Advanced Signal Image Sciences (CASIS). May 15, 2019.

Borovikov, et al., Towards Interactive Training of Non-Player Characters in Video Games, Jun. 3, 2019.

Borovikov, et al., Towards Interactive Training of Non-Player Characters in Video Games, Presentation Slides, Jun. 14, 2019.

Zalavadia, How to use predictive analytics to optimize software delivery, Mar. 21, 2017.

Zhao, et al., Winning Isn't Everything: Enhancing Game Development with Intelligent Agents, Aug. 20, 2019.

* cited by examiner

VIDEOGAME TELEMETRY DATA AND GAME ASSET TRACKER FOR SESSION RECORDINGS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD OF THE DISCLOSURE

The described technology generally relates to issue tracking systems, troubleshooting techniques, and user interfaces for troubleshooting. More specifically, this disclosure relates to systems and techniques for recording, processing, and presenting session data associated with a recorded session, in which a user describes suggestions or problems for a software application.

BACKGROUND

Modern software applications can be incredibly large and very complex. For example, a modern video game can involve many millions of lines of code and thousands of assets (e.g., artwork, models, sprites, sounds, music, and so forth). This means that bugs or issues that arise during runtime can be difficult to locate, reproduce, troubleshoot, and fix.

To address this, some software applications allow users to directly submit support tickets for providing feedback/suggestions to improve the application or descriptions of bugs/problems encountered in the application. In some cases, a user may open a URL directing them to a web-based ticketing system for logging and submitting a support ticket. Some of these software applications can also be configured to automatically generate a bug report to include with the support ticket when the user encounters a problem, and the bug report may contain some basic technical information collected for the purposes of documenting, reporting, and fixing the problem.

However, these existing approaches for manual submission of support tickets can be inefficient, slow, and plagued by high user friction. For instance, a user may be required to fill out numerous text fields or navigate multiple dropdown menus in order to describe the relevant part of the application, provide details about the problem, indicate how severe the issue is, and so forth. Some users do not bother logging support tickets because it is too much effort for them, which can result in the loss of valuable feedback. Furthermore, support tickets received through these existing approaches for manual submission can be of very low quality and may require supplementation. In some cases, following the initial submission of the support ticket there may be additional back-and-forth with the user which can go on for days. For example, a user may be asked to attach a screenshot that the user forgot to attach in the initial support ticket.

Accordingly, there exists a need for issue tracking systems and troubleshooting techniques that allow users of a software application to easily provide suggestions or feedback on how to improve the software, or to easily describe problems, bugs, and defects that they encountered in the software and would like fixed—even if there are thousands or millions of users. These systems and techniques would enable the quick and efficient generation of high quality support tickets for developers of the application to review and also reduce the time needed to locate, reproduce, troubleshoot, and fix the issues reported in the support tickets. Embodiments of the present disclosure address these issues and more.

SUMMARY OF THE DISCLOSURE

Disclosed herein are issue tracking systems, troubleshooting techniques, and user interfaces for troubleshooting, which are associated with a user of a software application triggering recording of a session. During the session, the user may narrate suggestions for improving the application or problems/issue encountered in the application while they interact with the application in real-time. A recording engine of the application may record the user's interaction with the application and the user's narration, along with various other types of session data, such as telemetry data and call stack data related to execution of the application during the recorded session.

All of the recoded session data may be submitted to an issue tracking system to process and associate with a support ticket. The issue tracking system may store the session data and support tickets for numerous recorded sessions. A developer may be presented with a user interface, such as a web-based user interface provided by the issue tracking system, that can be used to review a support ticket and any recorded session data that is available.

In addition to allowing the developer to review the user's interaction with the application and the user's narration, the user interface may also be specifically tailored to allow the developer to quickly and efficiently review other types of available session data, in order to locate and identify the portion of the application data (e.g., the underlying programming code) that should be changed based on the user's description. The issue tracking system may also process session data to identify related tickets or recurring issues.

Accordingly, the issue tracking systems, troubleshooting techniques, and user interfaces for troubleshooting that are described herein allow the users of a software application to easily provide suggestions or feedback on how to improve the software, or to easily describe problems, bugs, and defects that they encountered in the software and would like fixed—even if there are thousands or millions of users. These systems, techniques, and user interfaces would enable the quick and efficient generation of high quality support tickets for developers of the application to review and also reduce the time needed for a developer to locate, reproduce, troubleshoot, and fix the issues reported in the support tickets.

Various aspects of the novel systems, techniques, and user interfaces are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, methods, and user interfaces disclosed herein, whether implemented independently of or combined with any other aspect. For example, a system may be implemented or a method may be practiced using any number of the aspects set forth herein. In addition, the scope is intended to encompass such a system or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

In various embodiments, a computer-implemented method is contemplated that is performed by a user application on a user computing device. The method may include receiving, within the user application, a user input to begin recording a session. In response to receiving the user input, the user application may record over a period of time: video data of an interaction between the user application and a user, wherein the video data captures the user application being interacted with by the user; audio data of a user narration during the interaction; telemetry data generated by the user application during the interaction; call stack data associated with execution of the user application during the user interaction; and decoded frame data identifying visible elements of the user application within the video data of the interaction. The method may additionally include transmitting, to an issue tracking system, the video data of the interaction, the audio data of the user narration, the telemetry data, the call stack data, and the decoded frame data.

In some embodiments, in response to receiving the user input, the user application may record overlay data over the period of time, wherein the overlay data comprises user markups or annotations provided by the user during the interaction. The method may additionally include transmitting, to the issue tracking system, the overlay data. In some embodiments, the video data of the interaction, the audio data of the narration, the telemetry data, the call stack data, and the decoded frame data are synchronized over the period of time. In some embodiments, the telemetry data includes telemetry events. In some embodiments, the telemetry data, the call stack data, and the decoded frame data are synchronized over the period of time via timestamps. In some embodiments, the audio data of the user narration is from a webcam recording of the user. In some embodiments, the audio data of the user narration is from a microphone recording of the user. In some embodiments, the audio data of the user narration comprises an audio transcript. In some embodiments, the video data of the interaction includes a plurality of frames, wherein the decoded frame data includes a plurality of asset maps, and wherein each asset map of the plurality of asset maps corresponds to a frame of the plurality of frames. In some embodiments, the video data of the interaction includes a plurality of frames, wherein the decoded frame data includes a plurality of shader maps, and wherein each shader map of the plurality of shader maps corresponds to a frame of the plurality of frames. In some embodiments, the visible elements identified by the decoded frame data are models rendered by the user application. In some embodiments, the visible elements identified by the decoded frame data are pixels rendered by the user application.

In various embodiments, a computer-implemented method is contemplated that is performed by an issue tracking system. The method may include receiving one or more transmissions from a user application, wherein the one or more transmissions include: video data of an interaction between the user application and a user, wherein the video data captures the user application being interacted with by the user; overlay data comprising user markups or annotations provided by the user during the interaction; audio data of a user narration during the interaction; telemetry data generated by the user application during the interaction; call stack data associated with execution of the user application during the interaction; and decoded frame data identifying visible elements of the user application within the video data of the interaction, wherein the video data of the interaction, the audio data of the user narration, the telemetry data, the call stack data, and the decoded frame data are synchronized over a period of time and are aggregately associated with a ticket. The method may additionally include, in response to receiving a request for the ticket from a developer, providing the video data of the interaction, the audio data of the user narration, the telemetry data, the call stack data, and the decoded frame data to the developer.

In some embodiments, the method may additionally include generating data for a user interface. The user interface may include: a video view configured to display the video data of the interaction; a user narration view configured to provide the audio data of the user narration, wherein the user narration view is synchronized to the video view; and toggle-able views of the overlay data, the telemetry data, the call stack data, and the decoded frame data, wherein the toggle-able views are synchronized to the video view. The method may additionally include providing the user interface for display to the developer. In some embodiments, the telemetry data includes telemetry events. In some embodiments, the telemetry data, the call stack data, and the decoded frame data are synchronized over the period of time via timestamps. In some embodiments, the video data of the interaction includes a plurality of frames, wherein the decoded frame data includes a plurality of asset maps, wherein each asset map of the plurality of asset maps corresponds to a frame of the plurality of frames, and wherein the visible elements identified by the decoded frame data include models rendered by the user application.

In various embodiments, a system is contemplated that includes a processor and a memory having instructions executable by the processor to cause the system to receive a user input to begin recording a session. The instructions executable by the processor may further cause the system to: in response to receiving the user input, record over a period of time: video data of the user application being interacted with by a user; audio data of a user narration during the user application being interacted with by the user; telemetry data generated by the user application during the user interaction; call stack data associated with execution of the user application during the user application being interacted with by the user; and decoded frame data identifying visible elements of the user application in the video data of the user application being interacted with by the user. The instructions executable by the processor may further cause the system to: transmit, to an issue tracking system, the video data, the audio data of the user narration, the telemetry data, the call stack data, and the decoded frame data.

In some embodiments, the instructions are executable by the processor to further cause the system to: in response to receiving the user input, record overlay data over the period of time, wherein the overlay data comprises user markups or annotations provided by the user during the user interaction with the user application; and transmit, to the issue tracking system, the overlay data. In some embodiments, the telemetry data, the call stack data, and the decoded frame data are synchronized over the period of time via timestamps.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1A:
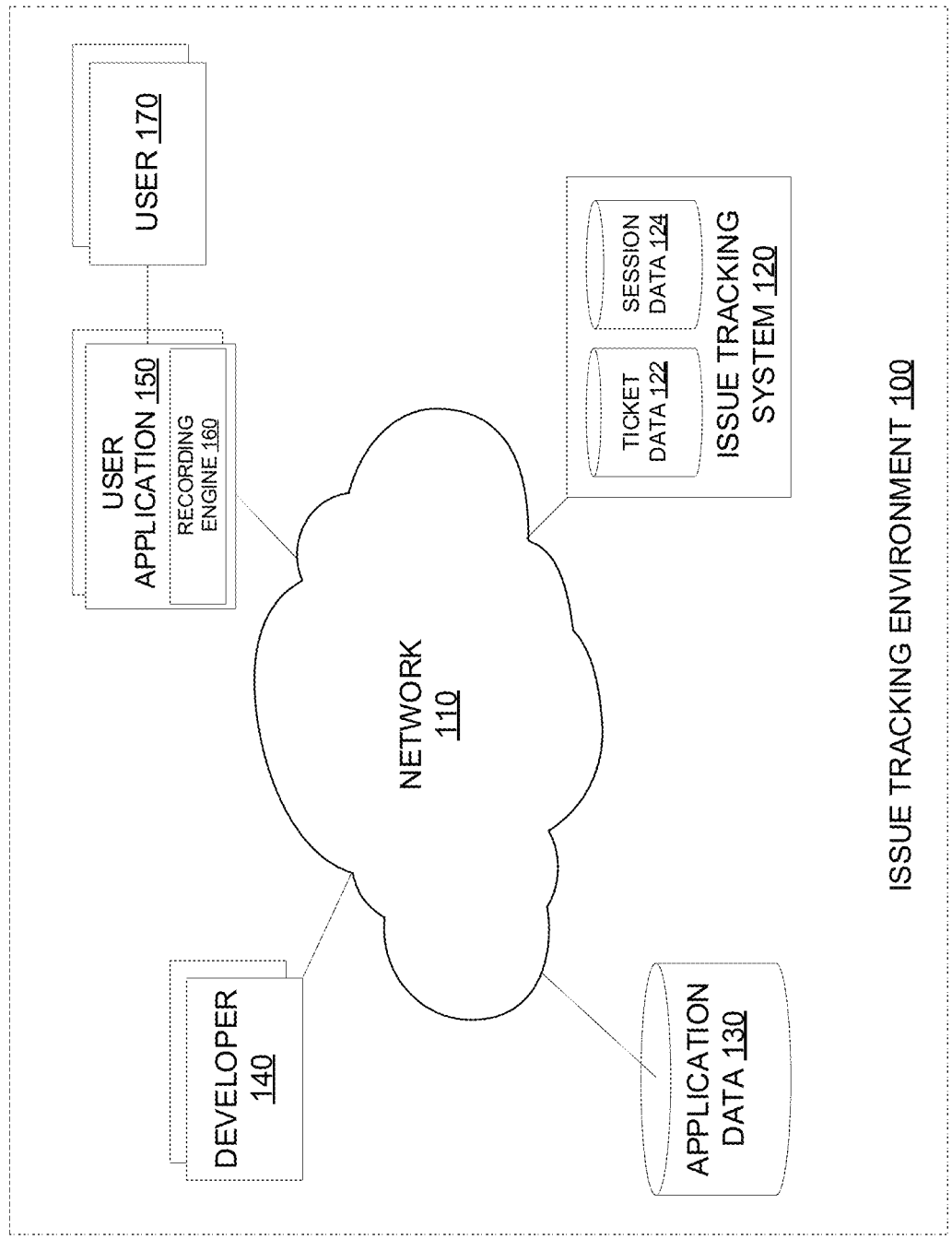
FIG. 1A is a block diagram illustrating an example issue tracking environment, in accordance with embodiments of the present disclosure.

Contemporary issue tracking systems and troubleshooting techniques used in software often involve users directly submitting support tickets for providing feedback/suggestions to improve the application or descriptions of bugs/problems encountered in the application. In some cases, a user may be directed to a web-based ticketing system for logging and submitting a support ticket, while in other cases, the software application may automatically generate a bug report containing some basic technical information collected for the purposes of documenting, reporting, and fixing the problem. However, there is a lot of hardship and friction associated with these approaches, which can discourage users from reporting problems and reduce the quality of received support tickets.

This specification describes issue tracking systems, troubleshooting techniques, and user interfaces for troubleshooting, which aim to integrate into the software application the ability for a user to record suggestions or feedback. In other words, the user may be able to talk through the problems as if the developer were sitting next to them and show what aspect of the application they want fixed, rather than having to write up the problem into a ticket to submit through the ticketing system. In other words, there may be a button in the application that the user can press to trigger the recording of a session (e.g., a troubleshooting session).

During the session, the user may narrate suggestions for improving the application or problems/issue encountered in the application while they interact with the application in real-time. A recording engine of the application may record the user's interaction with the application and the user's narration, along with various other types of session data, such as telemetry data and call stack data related to execution of the application during the recorded session. The recording engine can also collect information such as version information, the specs of the user computing device, and so forth. All of this data can be collected into a support ticket that is automatically generated for the user, or all of the recoded session data may be submitted to an issue tracking system to process and associate with a support ticket. The issue tracking system may store the session data and support tickets for numerous recorded sessions, and the issue tracking system may also process session data to identify related tickets or recurring issues.

It has traditionally been a painstaking process for developers to address problems that have been brought to their attention by users. In particular, a developer undergoes a manual process of determining and locating the relevant code or asset to make the updates needed. Even if the developer is provided high quality support ticket with a user-recorded video and telemetry data, the developer would still have to watch a video and hope to recognize a popup, a string, or a certain asset (e.g., mesh) visible in the video in order to correlate the video back to the relevant programming code or assets. Or the developer may have to look at the telemetry events, hope to recognize a telemetry event that may be associated with the problem, and manually run a query for that that telemetry event.

The issue tracking systems, troubleshooting techniques, and user interfaces for troubleshooting described herein also aim to reduce the time needed for a developer to locate, reproduce, troubleshoot, and fix the issues reported in the support tickets. In particular, a developer may be presented with a user interface, such as a web-based user interface provided by the issue tracking system, that can be used to review a support ticket and any recorded session data that is available. In addition to allowing the developer to efficiently review the various types of available session data, the user interface may automate some of the manual aspects of the review process and may also be specifically tailored to allow the developer to quickly locate and identify the portion of the application data (e.g., the underlying programming code) that should be changed based on the user's description. In other words, the issue tracking systems, troubleshooting techniques, and user interfaces for troubleshooting described herein provide an end-to-end solution with tools for developers to quickly turn around a high-quality support ticket and locate the actual programming code or assets that updates or modifications need to be made to in order to address the issue brought up by the user.

To summarize, the issue tracking systems, troubleshooting techniques, and user interfaces for troubleshooting that are described herein allow the users of a software application to easily provide suggestions or feedback on how to improve the software, or to easily describe problems, bugs, and defects that they encountered in the software and would like fixed—even if there are thousands or millions of users. These systems, techniques, and user interfaces enable the quick and efficient generation of high quality support tickets for developers of the application to review and also reduce the time needed for a developer to locate, reproduce, troubleshoot, and fix the issues reported in the support tickets.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse. In some cases, these forms of user input may be provided by the user through a virtual reality input device or an augmented reality input device.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), mass storage devices, and/or the like. Another example of a data store is a hosted storage environment that includes a collection of physical data storage devices that may be remotely accessible and may be rapidly provisioned as needed (commonly referred to as "cloud" storage). Additional examples of data stores may include non-transitory memory that stores data, such as dynamic random access memory (DRAM) device, a static random access memory (SRAM) device, flash memory or some other memory devices.

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Overview of Issue Tracking Environment

Figure 1B:
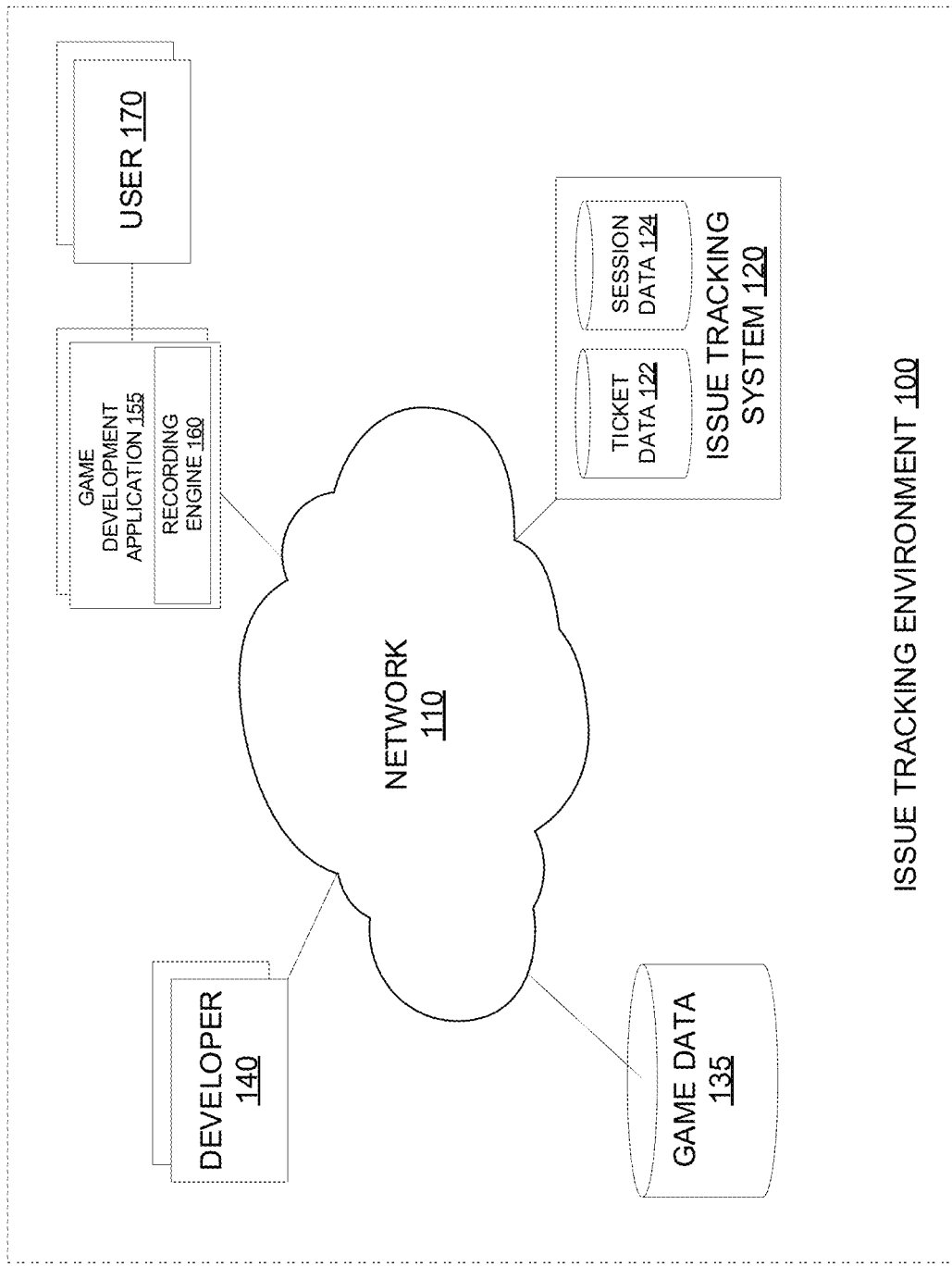
FIG. 1B is a block diagram illustrating an example issue tracking environment similar to that of FIG. 1A, in accordance with embodiments of the present disclosure.

With respect to the figures, FIGS. 1A and 1B are block diagrams that illustrates the components of an issue tracking environment 100.

As shown in FIG. 1A, the issue tracking environment 100 may include an issue tracking system 120, application data 130, one or more developers 140, and one or more user applications 150 being operated by one or more users 170. FIG. 1B illustrates some embodiments of the issue tracking environment 100, in which the one or more user applications 150 are specifically one or more game development applications 155 and the application data 130 is specifically game data 135. As described herein, any features associated with user applications may be applicable to game development applications and vice versa; similarly, any features associated with application data may be applicable to game data and vice versa. Additionally, for the purposes of simplicity and facilitating understanding, the following descriptions will describe the issue tracking environment 100 by referring to a single developer 140, user application 150, and user 170; however, it should be understood that there can be numerous developers 140, user applications 150, and users 170.

The components of the issue tracking environment 100 may be communicatively connected through network 110, which can be of a conventional type, wired or wireless, and may have numerous different configurations including a star configuration, token ring configuration or other configurations. Furthermore, the network 110 may include a local area network (LAN), a wide area network (WAN) (e.g., the Internet), and/or other interconnected data paths across which multiple devices may communicate. In some implementations, the network 110 may be a peer-to-peer network. The network 110 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Application data 130 may be stored in one or more data stores, and the user application 150 may specifically be associated with the application data 130. Application data 130 may include data that cannot be modified by the user 170 during execution of the user application 150. For instance, application data 130 may include any programming code or assets used to generate copies of the user application 150. Any updates to the application data 130 may be implemented by having new versions of the user application 150 be generated and distributed, or by propagating the changes to the user application 150 via patches. When the application data 130 is game data 135 as in FIG. 1B, the game data 135 may include programming code and assets such as models, sprites, artwork, and so forth (e.g., game data that cannot be modified by players during execution of a game application or game development application 155).

Developer 140 may be able to use a developer computing device (not shown) to access components of the issue tracking environment 100, such as the issue tracking system 120 or application data 130. The developer computing device may include a display and a processor, and it may include computing devices such as a personal computer, a laptop, a tablet, a mobile device, a gaming console, and/or the like.

Developer 140 may access the application data 130 in order to change, manipulate, and/or create the programming code or assets associated with the user application 150. The application data 130 may be under version control/management, such that any changes may result in a new version of the application data 130. The new version of application data 130 can then be used to build out executable instances of the user application 150 or processed to produce updates for the user application 150 on various platforms.

User application 150 may be run on a user computing device (not shown) of the user 170. The user computing device may be a desktop computer system or personal computer, a laptop, a tablet, a mobile device, a gaming console, a wearable computer, a virtual reality device, an augmented reality device, and/or the like. In some cases, the user computing device may include a components or devices for recording video, audio, user inputs and/or motion of the user 170. For instance, the user computing device may be connected to a webcam used to record video of the user 170. In some embodiments, the user computing device may be associated with, or connected to, a virtual reality input device or augmented reality input device that may capture user inputs, motion of the user of 170, interactions between the user 170 and the user application 150 (e.g., the user application 150 may be a virtual reality application that simulates and presents a virtual environment to the user 170, and the virtual reality input device may capture the user inputs of the user 170 as they interact with this virtual environment), and so forth. The user computing device may include a display and a processor; the user computing device may be connected (e.g., via a wireless or wired connection) to the display, which may be used by the user application 150 and the user computing device to render graphics in real-time (e.g., the user application 150 can be an interactive video game or game development application 155). The user application 150 may enable the user computing device to communicate with the issue tracking system 120 through the network 110.

User application 150 may include a recording engine 160 that is used to record various types of session data in connection with a session, in which the user 170 provides suggestions/feedback or describes problems associated with the user application 150. The recording engine 160 may record the session data obtained from various different sources, such as from the user application 150, the user computing device, components of the user computing device, the operating system running on the user computing device, and so forth. In some cases, the user 170 may be able to access an option in user application 150 or provide a user input that triggers the recording engine 160 to begin recording various types of session data in connection with a session. Once the user 170 has finished providing suggestions/feedback or describing problems associated with the user application 150, the user 170 may end the session and the recording engine 160 may send the recorded session data to the issue tracking system 120 via the network 110.

In some embodiments, issue tracking system 120 may operate on one or more hardware servers that are communicatively coupled to network 110 and include a processor, a memory and network communication capabilities. In some embodiments, issue tracking system 120 may operate on a system of one or more computers, one or more virtual machines executing on a system of one or more computers, as a cloud computing service (e.g., on a cluster of computing devices), and so forth. The issue tracking system 120 may include, or have access to, ticket data 122 and/or session data 124, which may be stored among one or more data stores. Although described separately, it should be understood that in various embodiments the described components and servers can generally be integrated together in a single component or server. The issue tracking system 120 may be configured to receive recorded session data associated with a session from the user application 150, store that data among the session data 124, generate a support ticket associated with the session, and store the support ticket among the ticket data 122. Additional details associated with the ticket data 122 and session data 124 are provided in connection with FIG. 2. In some embodiments, some of the described functionality of the issue tracking system 120 may be integrated into the user application 150 and/or a third-party device or service. For instance, in some cases, the issue tracking system 120 may transcribe audio of the user 170 recorded during the session, but in some cases that functionality may be performed by the user application 150 or a third-party service (with the resulting transcript(s) sent to the issue tracking system 120).

Issue tracking system 120 may enable the developer 140 to review one or more support tickets within the ticket data 122 and any session data 124 associated with those support tickets. In some embodiments, the issue tracking system 120 may be able to generate user interface data and provide a user interface to the developer 140 that allows the developer 140 to review support tickets and their associated session data. In some embodiments, the issue tracking system 120 may generate a web-based user interface that the developer 140 can access via the network 110 (e.g., using a web browser).

Figure 2:
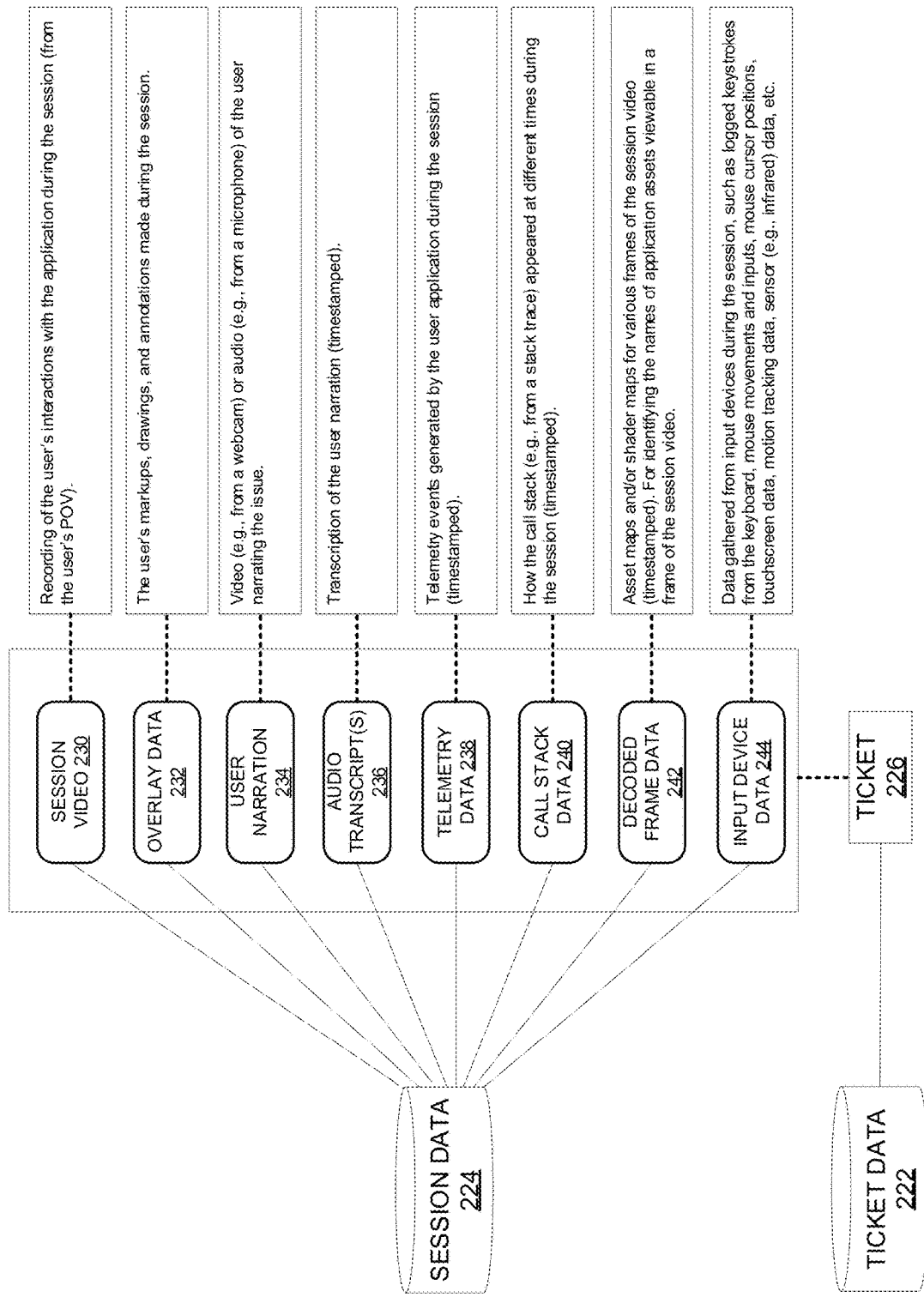
FIG. 2 illustrates examples of various types of session data associated with an issue tracking system, in accordance with embodiments of the present disclosure.

In some cases, the developer 140 may review a support ticket in the ticket data 122 and any associated session data in the session data 124, such as via a user interface similar to the ones shown in FIGS. 4-9. Examples of the types of available session data are shown in FIG. 2. Among the session data may be a narrative of the user 170 that provides suggestions/feedback or describes problems associated with the user application 150, as well as a session video that records the interactions of the user 170 with the user application 150 taken during the session. The developer 140 may review all this information in order to identify changes to make to the application data 130.

Example Types of Session Data

FIG. 2 is a block diagram illustrating examples of various types of session data associated with an issue tracking system. More specifically, FIG. 2 illustrates some of the types of session data 224 that can be received, processed, and stored by an issue tracking system. For instance, in the context of FIG. 1A, the session data 224 may correspond to session data 124 and may include various types of data recorded during a session by the recording engine 160 of the user application 150 and sent to the issue tracking system 120.

Session data 224 may be stored in one or more data stores, and it may include all available data received by an issue tracking system for each of one or more sessions, with each session being a separate instance of a user providing a suggestion and/or describing an issue for troubleshooting purposes. A recording engine of the user application (e.g., recording engine 160 of a game development application 155) may record various types of data associated with the session and send all of that data to the issue tracking system.

In some embodiments, the data associated with a particular session may include various kinds of data, which can be stored as different file types/formats. In other words, session data 224 can be a heterogeneous collection of different file types/formats. The recording engine may save the various types of recorded data for a session into different files and keep those file separate. These files can be sent to the issue tracking system, which may also store the different kinds of data associated with a session as separate files of various file types/formats within the session data 224, rather than combining all the data for the session into a single file. Storing the different types of data for a session as separate files may be beneficial because storing all the data as a single file may reduce flexibility (e.g., transcribing audio of the user narration would require the entire file) and restrict the data to a single purpose. In some embodiments, the issue tracking system may generate and associate a ticket 226 with a session and all the received data for the session (e.g., all the data or files received from the recording engine of the user application).

As illustrated, the various kinds of data in session data 224 that can be associated with a particular session may include one or more of: session video 230, overlay data 232, user narration 234, audio transcript(s) 236, telemetry data 238, call stack data 240, decoded frame data 242, input device data 244, and so forth. However, session data 224 may additionally include other types of data not illustrated in the figure.

Session video 230 may include a recording of the user's interactions with an application during the session, recorded from the user's point-of-view. This recording may include video or it may include both video and audio. In some embodiments, this recording may faithfully capture what is being presented to the user on-screen (e.g., on a display device, such as a computer screen associated with the user computing device) during the session, similar to the recordings taken by third-party screen capture software. In other words, the recording may capture the mouse cursor and its position/movement, menu interactions, visual bugs or glitches (including those attributable to the hardware of the user's computing device), and so forth. The recording may also faithfully capture the audio that can be heard by the user (e.g., on an audio output device, such as speakers or headphones associated with the user computing device) during the session.

Overlay data 232 may include data that captures the user's markups, drawings, and annotations made during the session. The overlay data 232 may also capture the actions (e.g., movements and strokes) associated with creating the user's markups, drawings, and annotations. More specifically, the user application may provide the user access to various on-screen tools for drawing and editing different types of graphics (e.g., text, shapes, free-form, and so forth) during the session. For instance, a user may be able to use a free-form drawing tool to draw a circle around a specific object displayed in the application during the session, in order to draw attention to that particular object. The user could also use the same free-form drawing tool in order to scribble out the area around the circle, in order to further draw attention to that particular object. In other words, the user may be able to markup or annotate parts of the application that the user would like the developer to look at or not look at (e.g., by darkening out an area of the application visible on-screen). For example, if during the session, the user drew a circle around a specific object in the application, the overlay data 232 may capture the encircling and not just the resulting circle and its position. Keeping this overlay data 232 separate from the session video 230 allows display of the overlay data 232 to be toggled on and off during playback of the session video 230, which can be beneficial if the overlay data 232 obstructs the developer's ability to interpret the session video 230.

User narration 234 may include video and/or audio of the user's commentary captured during the session, which will typically be associated with the user describing or discussing an issue to be fixed or a suggestion to be implemented within the application. For example, a video of the user's narration (e.g., user video) can be captured via a video camera, such as a webcam, associated with the user's computing device. Audio of the user's narration (e.g., user audio) can be captured via an audio input device, such as a microphone, associated with the user's computing device. In some cases, just an audio recording of the user's narration may suffice when a video of the user's narration cannot be captured.

Audio transcript(s) 236 may include one or more transcriptions of the audio component of the user's narration for the session. In some cases, there may be only one transcription made for the narration. For instance, an audio transcript can be generated that will be in the same language as the one used in the narration (e.g., the user described an issue in English and the corresponding audio transcript will be in English). However, in some embodiments, there can be numerous audio transcripts in different languages made from the narration, which will enable a developer who speaks a different language than that of the user to still handle the ticket, thereby expanding the numbers of developers capable of handling the ticket. Audio transcripts can be generated from the audio component of the user's narration by the issue tracking system, by a third-party system or service, by the recording engine of the application on the user's computing device, or any combination thereof.

Telemetry data 238 may include telemetry events generated by the user application during the session. In software, telemetry events can be used as breadcrumbs and may be commonly associated with the pressing of buttons in a user interface, the beginning and ending of importing an asset used in the application, and so forth. Telemetry events are often used to gather data on the use and performance of applications and application components (e.g. how often certain features are used, measurements of start-up time and processing time, hardware, application crashes, and general usage statistics and/or user behavior). In some cases, very detailed telemetry data is reported like individual window metrics, counts of used features, and individual function timings. This telemetry data may include data from a wide variety of endpoints that cannot all be possibly tested by the developer 140, providing insights such as the popularity of certain features and whether they should be given priority or be considered for removal.

As the user application is running during the session, telemetry events are being fired in the background and these telemetry events can be logged and stored on a server (e.g., the user application 150 may transmit the telemetry events to a server) or they can be locally stored. In some embodiments, all the telemetry events can be captured into a file with time markers or timestamps of when those events triggered (e.g., an event triggered at twenty seconds into a session would be captured into the file along with the timestamp), and that file can be sent to the issue tracking system to be saved under telemetry data 238. In some embodiments, the telemetry data 238 may also include a link or query associated with each recorded telemetry event, and these links may be used to retrieve additional details about all the telemetry events in the session, any available data associated with those events, or just the data associated with that particular telemetry event (e.g., by using the associated link or query to retrieve all the data from a server storing the telemetry data).

In some cases, the recording of telemetry events may be turned on during a session, and the available telemetry data 238 may include the telemetry events from the session. In some cases, the user application may always be recording telemetry events when it is running, and even if the telemetry events included in the telemetry data 238 do not consist of all available telemetry events, the telemetry data 238 may include links or queries that enable a developer to query a server or the user computing device in order to obtain full details for the telemetry events. Constantly recording telemetry events can be useful if there is an issue involving a rare or difficult-to-repeat telemetry event that occurred for the user and the user was unable to replicate the issue during a recorded session.

Call stack data 240 may capture how the call stack (e.g., from a stack trace) of the user application appeared at different times during the session. More specifically, the call stack may be a stack data structure that stores information about the active subroutines of the user application as it runs on the user computing device during the session. This information may be useful to the developer; depending on how the application is written and compiled, inspection of call stack data can be used to determine intermediate values and function call traces, debug errors, and profile the performance of the application. Furthermore, the call stack provides a view into which code is currently running (e.g., which systems of the application are active, what files are being executed, and so forth), which can be useful if a telemetry event can be caused by multiple portions of the programming code and it is not immediately obvious which portion of the code is triggering that telemetry event.

As the user application is running during the session, the recording engine may continually inspect and log a snapshot that captures the state of the call stack. For example, the recording engine may take a snapshot of the call stack for every frame of the recorded session video. All of this data can be logged and stored on a server (e.g., the user application 150 may transmit the call stack data to a server) or it can be locally stored. In some embodiments, the call stack data can be captured into a file with time markers or timestamps of when each snapshot was taken or indicating how long the state captured by a snapshot persisted (e.g., the file may contain a saved snapshot taken at twenty seconds into the session, but the next saved snapshot may correspond to thirty seconds if the state of the call stack in the previous snapshot persisted for ten seconds). The file can be sent to the issue tracking system to be saved under call stack data 240.

Decoded frame data 242 may include one or more maps generated by the recording engine of the application for each frame of the session video, which can be used to map out and identify/characterize visible elements (e.g., anything of interest that is visible) in the frame. Visible elements may include assets, objects, models, artwork, sprites, shadows, shading, and so forth. In some embodiments, a map may have a pixel resolution such that the map identifies or characterizes each pixel that is visible in a frame. In practice, the decoded frame data 242 may include many different kinds of maps, such as asset maps, animation maps, shader maps, renderer maps, UI maps, and so forth, that are generated by the recording engine of the application for each frame of the session video. In some embodiments, the recording engine may continually determine the locations and names of anything of interest that is visible and save that data into maps for each frame as the session video is recorded. In other embodiments, the recording engine may record the session video and then perform post-processing on each frame of the session video in order to generate the maps for each frame. In some embodiments, the recording engine may correlate a frame with telemetry data in order to determine the names and locations of objects visible in the frame. In some embodiments, the maps may have a pixel resolution such that the map identifies or characterizes each pixel that is visible in a frame.

These maps may be useful for a variety of reasons. In particular, although the user may add markups (e.g., overlay data 232) to a scene in the application and draw circles around anything of interest visible in the frame, it may be difficult for the developer to know the actual name of the thing and how it is referred to in the application data. For instance, the developer may still have difficulties locating and identifying the thing of interest in the application data to make changes to it. These maps can be used to characterize or identify anything visible in the frame in reference to the application data or programming code of the application, which enables developers to quickly and efficiently locate the portion of the application data that needs to be modified. In some embodiments, data from the maps can be optionally presented over playback of the recorded session video to make it even easier to locate relevant portions of the application data.

For instance, an asset map may be used to map out and identify the names of various assets (e.g., models, graphics, etc.) of the application that can be seen in a frame of the session video. Each frame in the video may contain a variety of objects such as models, graphics, user interface elements, and so forth, and it may be understood that each of the objects may belong to a named asset in the application data. For example, if a frame contains two different buildings side-by-side that are rendered on-screen and the user has circled the building on the left, the asset map for the frame will include the on-screen position and names of all visible assets (e.g., both of the buildings) and can be used to learn the name of the model of the circled building (e.g., as it is referred to in the application data). In some embodiments, there may be an optional toggle to display asset map data over playback of the session video, which can result in special text appearing over the visible assets in each frame of the video that identifies the name of each asset (e.g., as it is referred to in the application data). In some embodiments, if the asset map data has a pixel resolution, then for each frame the corresponding asset map would indicate which name asset that each visible pixel belongs to. For instance, in regards to the previous example, if the on-screen area was 100×100 pixels, then an asset map may contain data regarding which of those pixels are associated with the left building and which of those pixels are associated with the right building.

Other types of maps that can be generated for a frame include animation maps that identify the locations and names of animations that are currently being played in a frame (e.g., "animation1" is being played for the building on the left and "animation2" is being played for the building on the right), shader maps which identify which shaders are being used to shade different parts of the scene, renderer maps which identify which renderers are activated and used to render different parts of the scene, UI maps which identify which user interface elements are visible in different parts of the scene, and so forth. In some embodiments, these maps may also have a pixel resolution such that the map identifies or characterizes each pixel that is visible in a frame.

Input device data 244 may include data gathered from input devices during the session, such as logged keystrokes from the keyboard, mouse movements and inputs, mouse cursor positions, touchscreen data, motion tracking data, sensor (e.g., infrared) data, virtual reality or augmented reality (VR/AR) device inputs, and so forth. The recording engine may collect this data for the developer to review, in case there is a problem in the application associated with particular user inputs or if the overall processing of user inputs can be improved. For example, a user application may involve motion tracking of the user via an infrared sensor associated with the user computing device (e.g., the infrared sensor may continuously record data associated with the user's motion during the session), and if there is an issue with the user application caused by a particular gesture or motion made by the user, the motion tracking data for the session can be saved and used to determine the underlying issue. As a more specific example, a user application may be a virtual reality application that runs on the user computing device (e.g., a virtual reality device) to simulate and present a virtual environment to the user. The user computing device may include or be connected to a virtual reality input device, which may be used to capture any relevant user input data in the context of a virtual reality application (e.g., gestures/motion data, the relative location of the user as the user walks around, voice commands issued by the user, and so forth) as the user interacts with the virtual environment and the virtual reality application. For instance, a user may perform a walkthrough of the virtual environment (e.g., a level or world in a video game application) to provide feedback and the user may use hand motions (e.g., pointing a finger, drawing a circle with their arm, etc.) to make annotations in 3D space in order to show a problem with some of the assets in the virtual environment. The virtual reality input device may capture the raw data associated with those hand motions as input device data 244 (the annotations themselves, as they are displayed in the virtual environment, may be considered overlay data 232, although there may be some correlation between the hand motions and the annotations they produce).

In some embodiments, as the issue tracking system receives all the various kinds of session data associated with a session and stores it within session data 224, the issue tracking system may generate a support ticket 226 and associate it with the session and the session data. The issue tracking system may add the ticket 226 for the session to ticket data 222, with may be stored in one or more data stores and may include all of the tickets generated for the sessions handled by the issue tracking system. In various embodiments, the ticket data 222 may be a catalog or database of all the tickets, with each ticket being associated with a session (e.g., a problem or suggestion described by a user). Very often a ticket will be associated with a session video, an audio transcript, overlay data (e.g., user markups), decoded frame data (e.g., maps), telemetry data, and call stack data, all of which were recorded during the session. Accordingly, a developer that accesses the issue tracking system may be able to look at the various tickets in the ticket data 222, focus on a particular ticket of interest, and then retrieve/access/review the session data associated with that ticket. In some embodiments, specific tickets may be assignable to a particular developer to review.

In some embodiments, the issue tracking system may be able to perform analysis and post-processing on the available session data 224, such as to identify related sessions (e.g., sessions directed to the same problem or issue). Some of this processing may involve machine learning algorithms. For example, the issue tracking system may be able to review the decoded frame data 242 (e.g., asset maps) and overlay data 232 for numerous sessions, in order to identify all the sessions in which the user circled a specific asset. The issue tracking system could put all the tickets associated with those sessions into a single bucket or queue for a developer to review. As another example, the issue tracking system could use the decoded frame data 242 (e.g., animation maps) to identify all the tickets associated with sessions that involved a particular animation. Thus, analysis and post-processing of the available session data 224 may be especially useful for identifying all the tickets associated with a particular problem area.

Example Formats of Session Data

Figure 3:
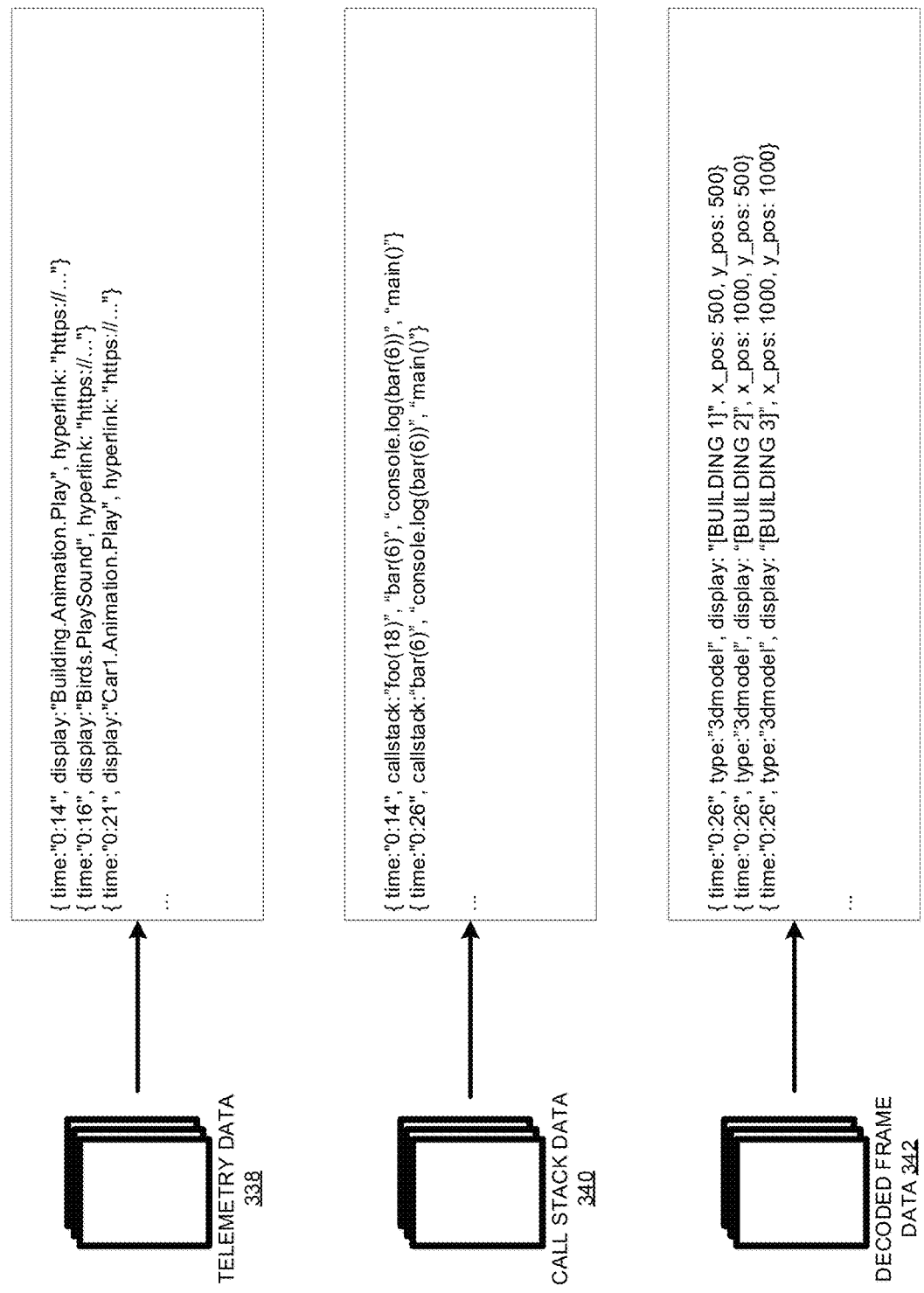
FIG. 3 illustrates example formats of some of the session data associated with an issue tracking system, in accordance with embodiments of the present disclosure.

FIG. 3 illustrates example formats of some of the session data associated with an issue tracking system.

An example format that the telemetry data 338 may be stored under is shown in the figure. Each line may correspond to a separate telemetry event and may include a timestamp or time marker for when the telemetry event triggered, a text string for the name of the telemetry event, and a URL or query associated with the telemetry event. In some embodiments, the URL or query may be a long string with parameters that can be used to query a server for additional data associated with the telemetry event. In some embodiments, there may be delimiters between different telemetry events. In some embodiments, separate telemetry events may be listed in different rows.

In some embodiments, the telemetry data 338 may be stored in accordance with any suitable timed text format (e.g., presentation of text media in synchrony with other media, such as audio and video). For instance, the telemetry data 338 may follow Timed Text Markup Language (TTML), WebVTT, or SubRip format, or the telemetry data 338 may follow the format of any subtitling standard.

An example format for the call stack data 340 is also shown in the figure. Each line may correspond to a snapshot of how the call stack appeared over a specific period of time before the call stack changed. Each snapshot may include a timestamp or time marker for when that snapshot was generated and the state of the call stack during that snapshot, such as the code running at the time. In some embodiments, there may be delimiters between different snapshots. In some embodiments, separate snapshots may be listed in different rows. For example, in call stack data 340 the first row corresponds to a snapshot of the call stack taken at time "0:14", which indicates the state of the call stack at that time included the active subroutines: "foo(18)", "bar(6)", "console.log(bar(6))", and "main( )."

An example format for decoded frame data 342 is also shown in the figure. Each line may correspond to an object of interest in a frame of the session video and may include a timestamp or time marker for the particular frame, the type associated with the object of interest, a name or identifier of the object of interest, and an on-screen position (e.g., X and Y coordinates) of the object of interest. In some embodiments, there may be delimiters between different objects of interest. In some embodiments, separate objects of interest may be listed in different rows. In the illustrated example, decoded frame data 342 may correspond to asset map data, which identifies the name and location of assets (e.g., models) that are visible in frames of the session video. For example, in decoded frame data 342 the first row corresponds to a model named "BUILDING 1" (e.g., in the application data) that is visible on-screen in the session video at time "0:14" at the location (500, 500), which indicates the state of the call stack at that time included the active subroutines: "foo(18)", "bar(6)", "console.log (bar(6))", and "main( )."

In some embodiments, the format of the decoded frame data 342 may include matrices or a matrix for each frame (e.g., a matrix with each element representing a pixel in the frame). In some embodiments, the format of the decoded frame data 342 may be a JSON file format that includes JSON objects (e.g., key-value pairs) describing each object or region of interest, the on-screen location (e.g., X and Y coordinates) of the object or region of interest, and so forth.

Example User Interfaces for Reviewing Recorded Sessions

Figure 4:
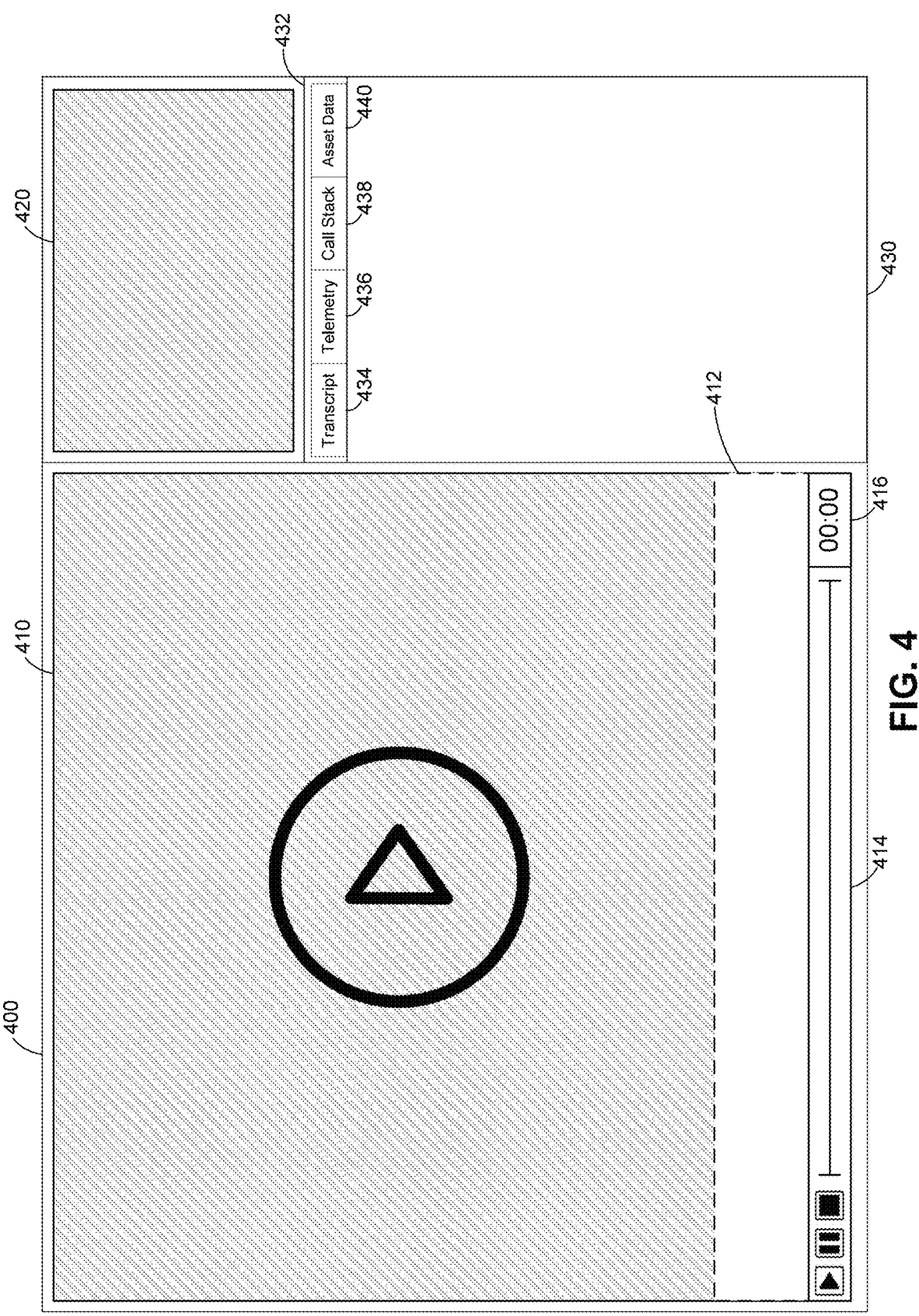
FIGS. 4-9 illustrate example user interfaces for reviewing a support ticket through an issue tracking system, in accordance with embodiments of the present disclosure.

FIG. 4 illustrates an example user interface 400 for reviewing a support ticket through an issue tracking system. In some embodiments, the user interface 400 may be a web page or a web-based user interface accessible through browser software, and a developer may be able to connect to the issue tracking system (e.g., through the network 110) to review tickets through the web-based user interface.

The example user interface 400 can be divided into different portions or windows. As depicted, the example user interface 400 is divided into multiple windows, including a session playback window 410, a user narration window 420, and a data browser window 430.

The recorded session video can be viewed in the session playback window 410. The session playback window 410 may include a video control bar 414 that includes video playback controls (e.g., play, pause, stop) and a progress bar or time slider for navigating playback of the recorded session video. The session playback window 410 may also include a video time display 416 that shows the particular time or frame that the session video has been cued to. In some cases, the video time display 416 can be part of the video control bar 414.

In some embodiments, the session playback window 410 may have a debug panel 412, which may be a reserved portion of the screen recorded during a session that contains pixels of various colors and arrangements for conveying various kinds of information that may be useful to the developer reviewing the session video. For example, the debug panel 412 may be a 100-pixel band at the bottom of the session playback window 410 and each pixel may be used to represent something depending on the color and position of the pixel. For instance, the pixels can be used to convey all the decoded frame data such as the asset maps described herein (e.g., if one pixel is a particular cyan color, the colors of the next two pixels may indicate the on-screen x and y coordinates of a particular asset, and so forth). The debug panel 412 may be especially useful if the user application is in post-production (e.g., it is a version intended for distribution) and does not have all the functionality typically associated with the recording engine 160 (e.g., recording decoded frame data into separate files).

The user narration window 420 may display the user's narration recorded during the session. Playback of the user's narration can be in synch with the recorded session video displayed in the session playback window 410, allowing the video control bar 414 to control both the session playback window 410 and the user narration window 420. The user's narration that is displayed in the user narration window 420 may be in the form of a recorded video of the user (e.g., taken using a webcam) or, if that is not available, in the form of recorded audio of the user (e.g., taken using a microphone).

A portion of the data browser window 430 may be occupied by a navigation bar 432, which can be used to navigate between the different types of available session data and bring up one of those types of session data for display in the data browser window 430. In the illustrated embodiment, the navigation bar 432 is at the top of the data browser window 430. The navigation bar 432 can include a number of tabs that correspond to different types of available session data, including the types of session data described in FIG. 2. For instance, there can be tabs associated with audio transcriptions (e.g., in various languages), telemetry data, call stack data, decoded frame data (e.g., frame-by-frame mappings for assets, shaders, etc.), and so forth. As illustrated, the navigation bar 432 includes a transcript tab 434, a telemetry tab 436, a call stack tab 438, and an asset data tab 440.

In some embodiments, the user interface may be a web-based user interface accessible through browser software, and a developer may be able to connect to the issue tracking system to review tickets through the web-based user interface.

Figure 5:
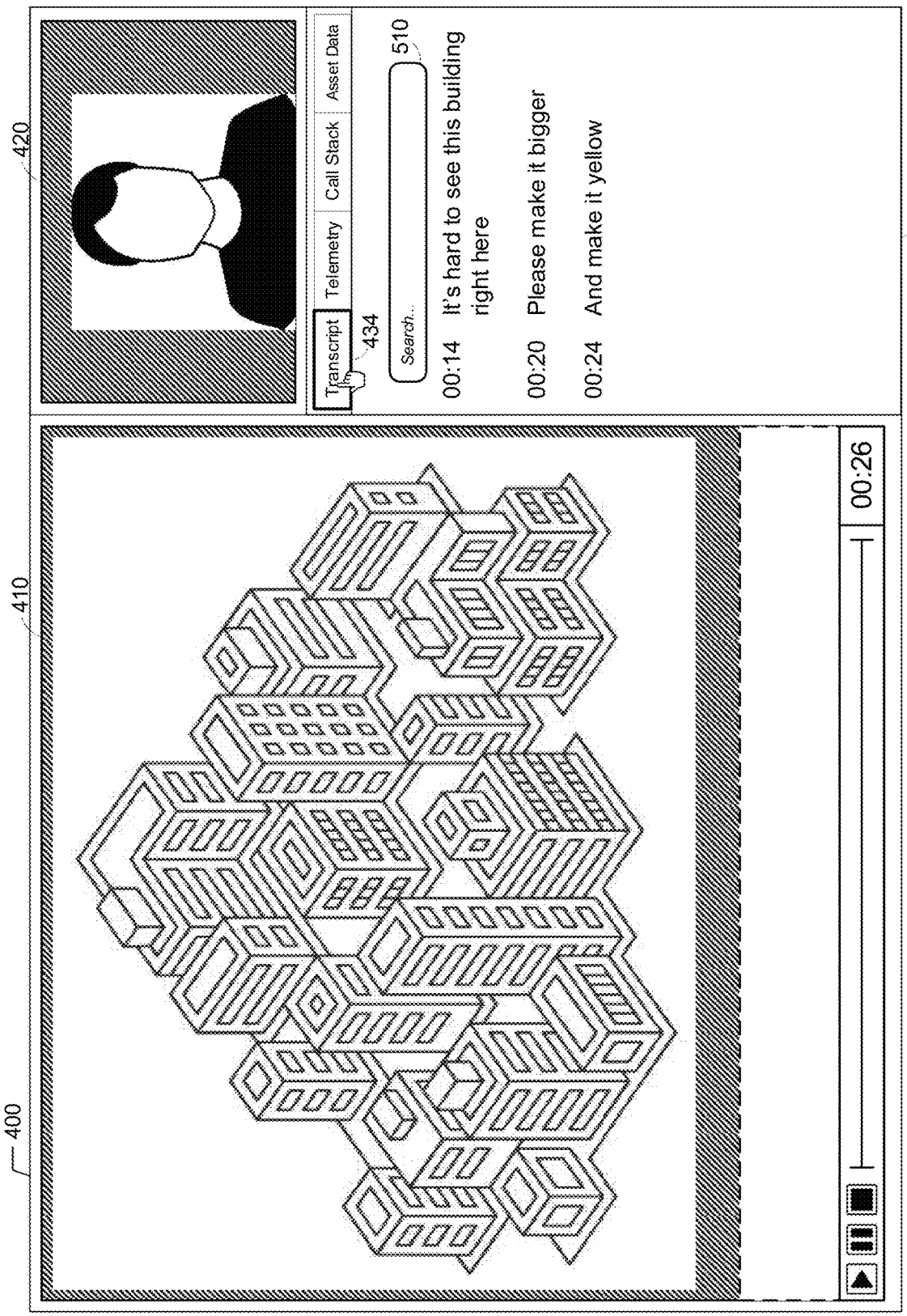

In FIG. 5, the user interface 400 is being used to investigate an example support ticket. In this instance, the user application may be a game development application (e.g., such as game development application 155) in which buildings are rendered and displayed to the user from an isometric perspective. Visible in the session playback window 410 is the session recording associated with the support ticket, which is a recording of the user's interactions with this application from the user's point-of-view. Visible in the user narration window 420 is a video of the user explaining the suggestion they are proposing or the issue they encountered in the application, which was recorded during the session by a webcam.

Selecting the transcript tab 434 causes an audio transcript of the user's narration (e.g., the entirety of the recording shown in the user narration window 420) to be displayed in the data browser window 430. In this example, the audio transcript is in English, but there can be multiple audio transcripts available that are in different languages, in case there is an alternative language that the developer understands. In some embodiments, the data browser window 430 may have a search box 510 that allows the developer to search through longer audio transcripts for specific terms.

The audio transcript may include time markers or timestamps for the user's narration, which can aid the developer in determining the portion of the audio transcript that corresponds to the current segment of the session video shown in the session playback window 410. In some embodiments (not shown), the portion of the audio transcript that corresponds to the current segment of the session video can be highlighted or bolded. Thus, as the session video plays, this highlighting or bolding can be continuously updated and used to step through the entire audio transcript and draw the developer's attention to the portion of the audio transcript that corresponds to what is being displayed in the session playback window 410. Additionally, the timestamps in the audio transcript can also be useful for the developer to identify a particular time or frame of interest to cue the session video to in the session playback window 410.

Figure 6:
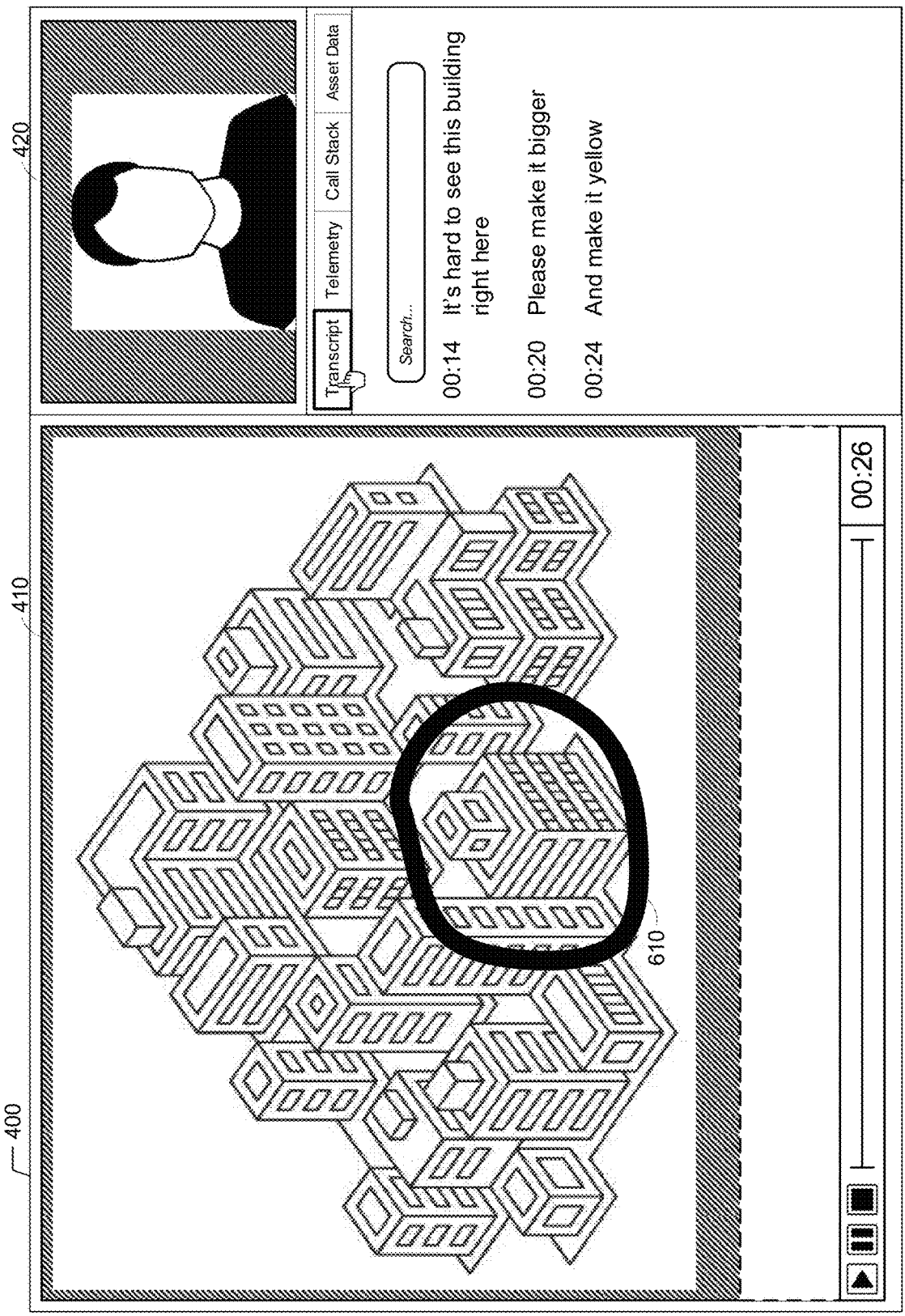

FIG. 6 is nearly identical to FIG. 5, but it has the addition of overlay data being shown in the session playback window 410. As described in connection to FIG. 2, the overlay data may include data that captures the user's markups, drawings, and annotations made during the session (e.g., using various on-screen tools for drawing and editing different types of graphics). For example, a user may be able to use a freeform drawing tool to draw a circle around a specific object displayed in the application during the session, to scribble out the area around the circle, and so forth.

In some embodiments, this overlay data may capture the actions (e.g., movements and strokes) associated with creating the user's markups, drawings, and annotations. For example, if during the session the user drew a circle around a specific object in the application—instead of just capturing the resulting circle and its position—the overlay data may capture the encircling. In some embodiments, the overlay data may include recorded video or animation that is separate from the session video and can be displayed in a layer on top of the session video.

In some embodiments, when overlay data is available among the session data, display of the overlay data may be toggled on and off in the user interface 400 by the developer. In the example illustrated in the figure, display of the overlay data has been turned on, and the overlay data has captured circle 610 that the user drew around a building in the scene. Based on the audio transcript timestamps shown in data browser window 430 and the elapsed playback time of the session video, it can be determined that the user drew circle 610 around a building that the user found issue with ("hard to see this building right here") and is proposing a suggestion for (" . . . make it bigger . . . and make it yellow").

Figure 7:
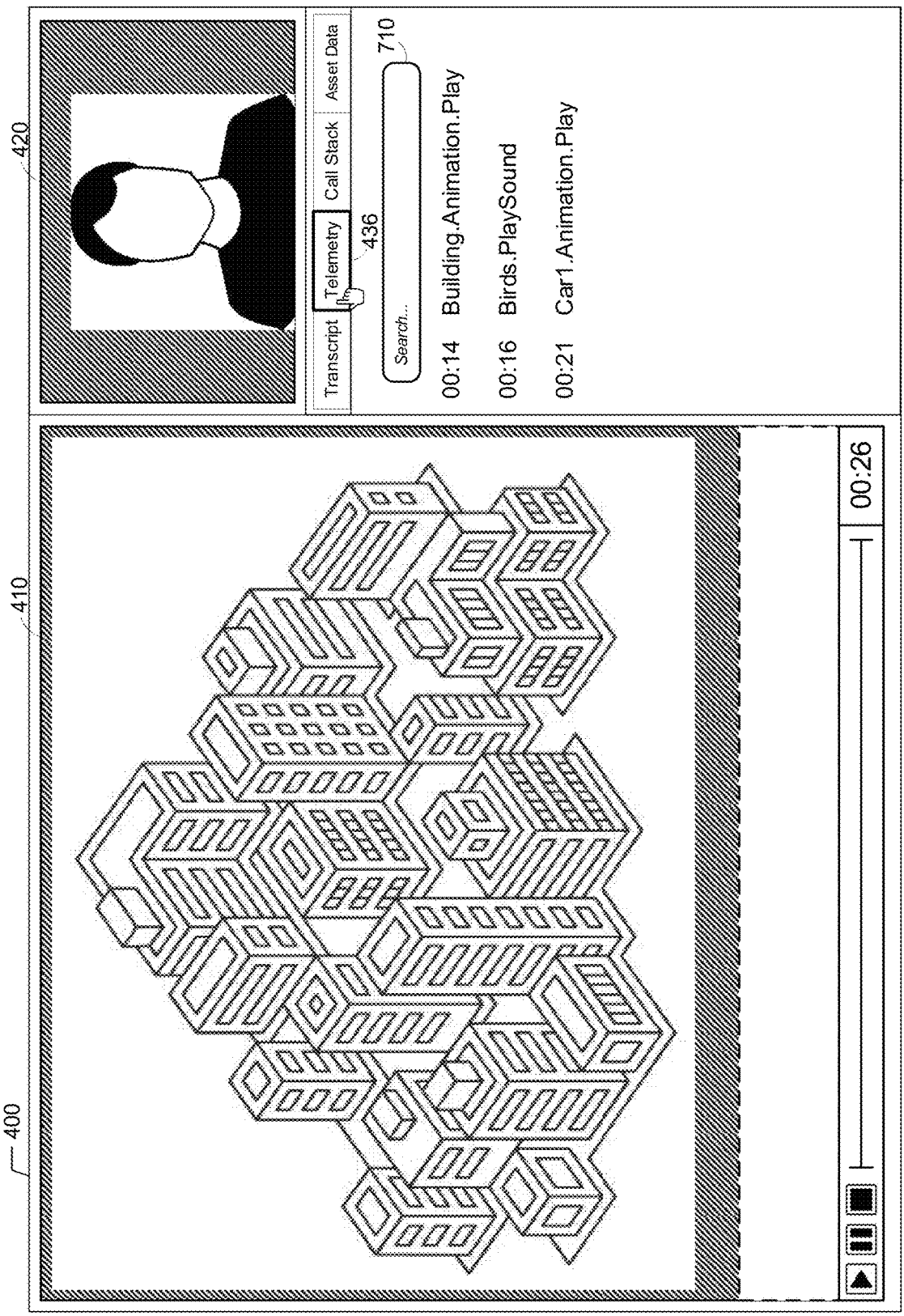

In FIG. 7, the telemetry tab 436 in the user interface 400 has been selected, which results in any available telemetry data being displayed in the data browser window 430. The availability of telemetry data collected during the session may depend on the code of the application, which may define and configure the types of telemetry events that are triggered and reported.

The telemetry data may include time markers or timestamps to indicate when each telemetry event was triggered in the session (e.g., relative to the session video). For instance, in the figure, it can be seen that the "Building.Animation.Play" event is associated with a "00:14" timestamp, which indicates that the event was triggered at a time corresponding to "00:14" of the session video shown in session playback window 410. In some embodiments, the data browser window 430 may have a search box 710 that allows the developer to search through the telemetry data for specific events.

Thus, if the user described during the session a problem or issue with the user application that may involve a captured telemetry event, such as an issue involving timing (e.g., how long it takes for a level to load or a reflection to update), then the developer reviewing the support ticket may select the telemetry tab 436 in order to look at any telemetry events captured during the session in order to identify the underlying problem and its corresponding part of the codebase in the game data.

In some embodiments, the telemetry data may also include a link or query associated with each recorded telemetry event, and the telemetry events displayed in the data browser window 430 may be displayed as hyperlinks instead of just text. A developer may be able to click on a particular telemetry event in order to retrieve additional details about what happened, such as all the telemetry events in the session, any available data associated with those events, or just the data associated with that particular telemetry event (e.g., by using the associated link or query to retrieve all the data from a server storing the telemetry data). For example, if a telemetry event shown in the data browser window 430 is "Dialog1" with no other events triggered in the time vicinity, a developer would not understand any context beyond the "Dialog1" event having been triggered. If "Dialog1" is shown as a hyperlink and the developer clicks on it, the link in the telemetry data associated with the "Dialog1" event can be used to query a server for the full list of telemetry events during the session (e.g., "Dialog 1", "Button1", "Dialog2", "Button2" . . . ) and all the data associated with those events.

If telemetry data is unable to be collected for the session, then there may not be any telemetry events displayed (e.g., selecting the telemetry tab 436 may not result in any telemetry events being listed in the data browser window 430). In such a case, a developer may be able to view call stack data in order to view what code is running at any point in the session. For instance, the developer may be able to hit pause during the session video and see the code call stack (e.g., for the user computing device) corresponding to that point of the video. Thus, as a developer is reviewing a portion of a session video in order to troubleshoot a problem, the developer can switch to the telemetry tab 436 in order to see if telemetry events are being fired. If not, the developer can immediately switch to the call stack view to identify the area of code to which telemetry events can be added. This feature is described further in connection with FIG. 8.

Figure 8:
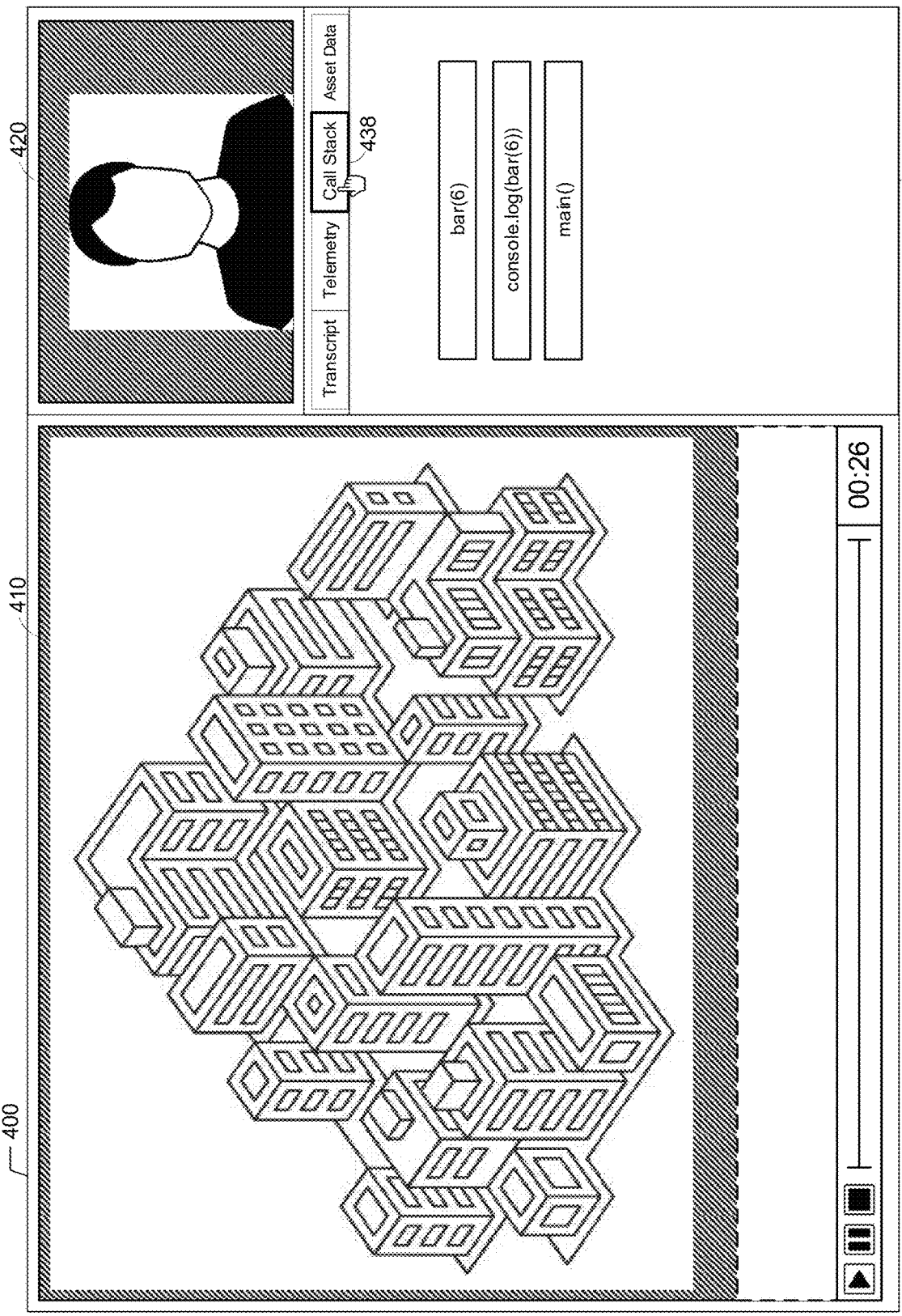

In FIG. 8, the call stack tab 436 in the user interface 400 has been selected, which results in any available call stack data being displayed in the data browser window 430. More specifically, the data browser window 430 may display a snapshot of how the call stack appeared at the time in the session video shown in session playback window 410. For example, in the illustrated figure, the session video in the session playback window 410 is cued to "00:26", or a frame that is twenty-six seconds into the session, and the call stack displayed in the data browser window 430 may reflect how the call stack appeared when that frame of the session video was recorded. Thus, the state of the call stack shown in the data browser window 430 will change throughout the session video, but the developer may pause the session video and adjust the time slider in the session playback window 410 in order to examine the state of the call stack at any particular moment of the session.

In some embodiments, aspects of the displayed call stack may be selectable and a developer may be able to click on a particular function or routine shown in the call stack in order to bring up the underlying programming code associated with that function or routine to the developer, such as by launching a code editor with the application's programming code (e.g., in the application data 130 or game data 135) pre-loaded and jumping to the part of the programming code specifically associated with that function or routine. This would enable the developer to inspect the programming code and also add telemetry events when telemetry events are not already available directly.

Figure 9:
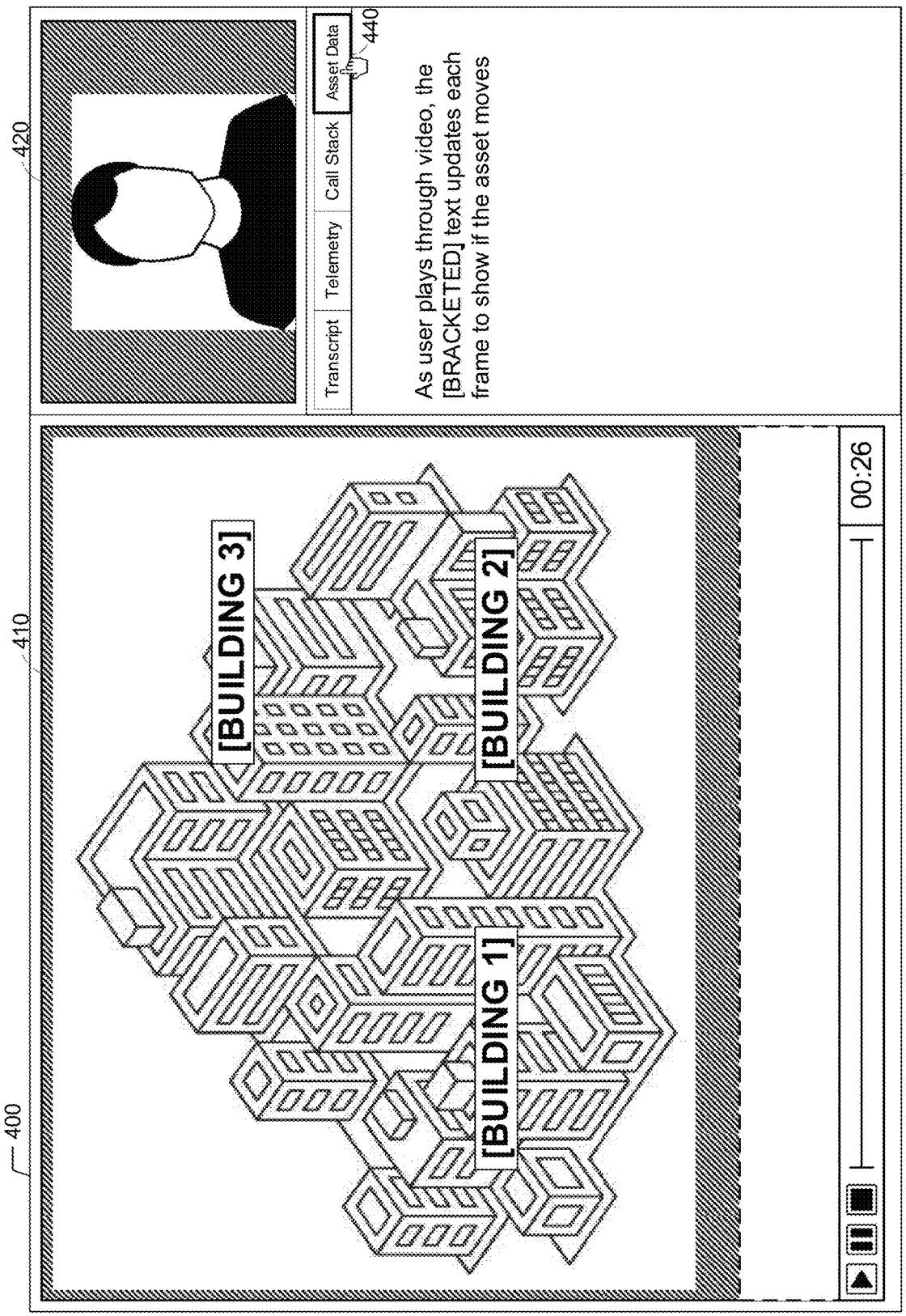

In FIG. 9, the asset data tab 240 in the user interface 400 has been selected, which may result in asset data (e.g., from asset maps) being shown as an overlay on the session video, frame-for-frame. For example, for each frame of the recorded session video, an asset map may have been saved that identifies the name of each application asset (e.g., models, sprites, artwork, and so forth) visible in the scene and the relative position of where that asset is displayed on-screen during the session. Thus, during playback of the session video, these asset maps can be used in order to identify the assets that are visible in any particular frame of interest of the session video. As assets move around from frame to frame, the indicated positions of the assets in the session playback window 410 can be continually updated using the data from each frame's asset map.

This can be very useful for a developer to fix bugs or issues that arise. For example, within the context of a game development application, if the user has spotted an issue with an asset rendered from game data, available asset maps can be used to identify the name of that particular asset and how it is referred to within the game data, which allows the developer to locate and modify the asset within the game data.

In the illustrated figure, it can be seen that [BRACK-ETED] text is shown over the session video in the session playback window 410. Each instance of [BRACKETED] text corresponds to an asset from the asset maps and is used to label the particular asset and mark its position on-screen. In this particular example, the assets include the models of three buildings and are labeled as [BUILDING 1], [BUILD-ING 2], and [BUILDING 3]. In other words, the [BUILD-ING 1] text label would be used to indicate to the developer the name of the building model that the label is positioned over, and the on-screen position of the text label can change if the asset moves during the session video. Thus, if the user describes an issue with the building model corresponding to the [BUILDING 1] text label, the developer could use this feature to quickly determine that "BUILDING 1" is the name of the model, locate that model in the game data, and then make the appropriate changes to the model.

In other embodiments, the user interface may allow other decoded frame data in addition to asset maps to be displayed as an overlay on the session video, frame-for-frame. For instance, there may be additional tabs to display animation maps, shader maps, and so forth.

Methods Associated with Session Data

Figure 10:
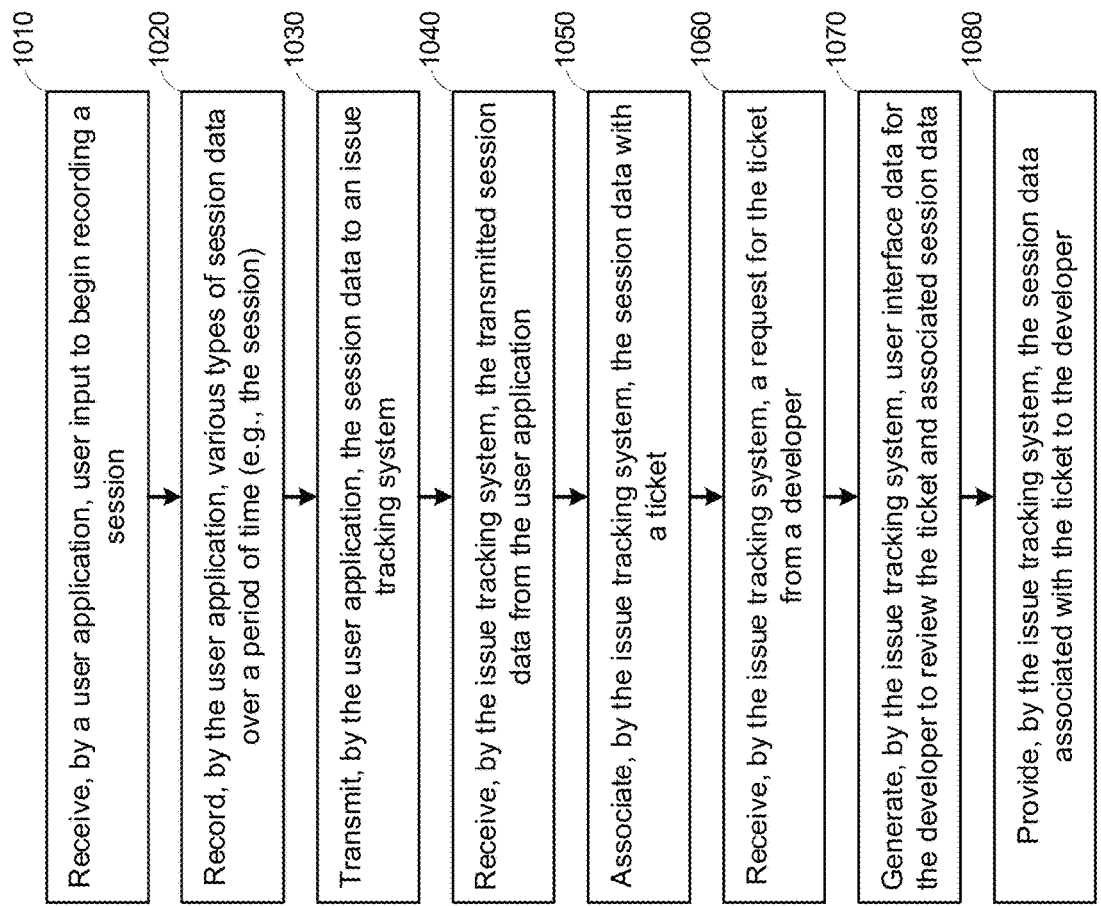
FIG. 10 is a flow diagram illustrating methods for recording, transmitting, receiving, and processing session data that are performed between a user application and an issue tracking system, in accordance with embodiments of the present disclosure.

FIG. 10 is a flow diagram illustrating methods for recording, transmitting, receiving, and processing session data that are performed by a user application and an issue tracking system.

At block 1010, a user application running on a user computing device may receive an input from the user to begin recording a session. For instance, the user application may have a user interface element, button, or menu option to begin recording a session in which the user may provide suggestions/feedback for the application or describe a problem encountered in the application. In some embodiments, the user application may be a game development application, such as a prototype or development build of a game application.

At block 1020, in response to receiving the user input, the user application may begin to record various types of session data over a period of time (e.g., the session). In some embodiments, a recording engine of the user application may perform the recording and collecting of the different types of session data. During the session, the user may operate and navigate the application to a particular function, scene, menu, etc., for which the user has a suggestion for or previously encountered a problem with, and the user may narrate and describe their suggestion or problem/issue, as if the user were describing it in real-time to developer sitting next to them. Examples of the session data recorded during the session may include session video (e.g., the user's interactions with an application during the session, recorded from the user's point-of-view), overlay data (e.g., the user's on-screen markups or annotations drawn during the session), user narration (e.g., video/audio recording of the user describing their suggestion or encountered problem), telemetry data (e.g., telemetry events triggered during the session), call stack data (e.g., snapshots of the state of the call stack throughout the session), decoded frame data (e.g., maps identifying/characterizing anything of interest visible in each frame of the session video), and so forth.

At block 1030, the user application may transmit all the session data to an issue tracking system once the session has ended. For instance, the user application may have a user interface element, button, or menu option to end recording of the session, and once the user stops recording the session the user application, the user application may automatically collect the recorded data/files and send them to the issue tracking system. In some embodiments, the user application may be a game development application, such as a prototype or development build of a game application. In some embodiments, the recording engine of the user application may transmit the various types of session data to the issue tracking system.

At block 1040, the issue tracking system may receive the transmitted session data from the user application. The issue tracking system may receive the different kinds of session data as separate files, which can be in different formats. The issue tracking system may retain and store these files separately, since combining all the data into a single file may reduce flexibility (e.g., transcribing audio of the user narration would require the entire file) and restrict the data to a single purpose.

At block 1050, the issue tracking system may associate all the session data for the session with a ticket. For instance, the issue tracking system may take the session data for a session and generate a support ticket that provides a summary or characterization of the problem and information about the version/build of the user application the session was recorded on. The support ticket may also identify or indicate the kinds of session data available and where the data is stored by the issue tracking system. The issue tracking system may save all the support tickets, with each ticket corresponding to a session and its associated session data.

At block 1060, the issue tracking system may receive a request for the ticket from a developer. In some embodiments, a developer may be able to log-in and access the issue tracking system (e.g., through the internet). The developer may be able to browse the tickets and view a particular ticket and its associated session data. For example, the issue tracking system may provide the developer with a list of tickets that have been assigned to the developer and the developer may select one of the tickets for review.

At block 1070, the issue tracking system may generate user interface data for the developer to review the ticket and its associated session data, and at block 1080, the issue tracking system may also provide the session data associated with the ticket to the developer. In some embodiments, the issue tracking system may generate user interface data for a web-based user interface that the developer may access through their web browser software in order to review the ticket and its associated session data. Examples of such user interfaces are shown and described in connection to FIGS. 4-9.

Example Hardware Configuration of Computing System

Figure 11:
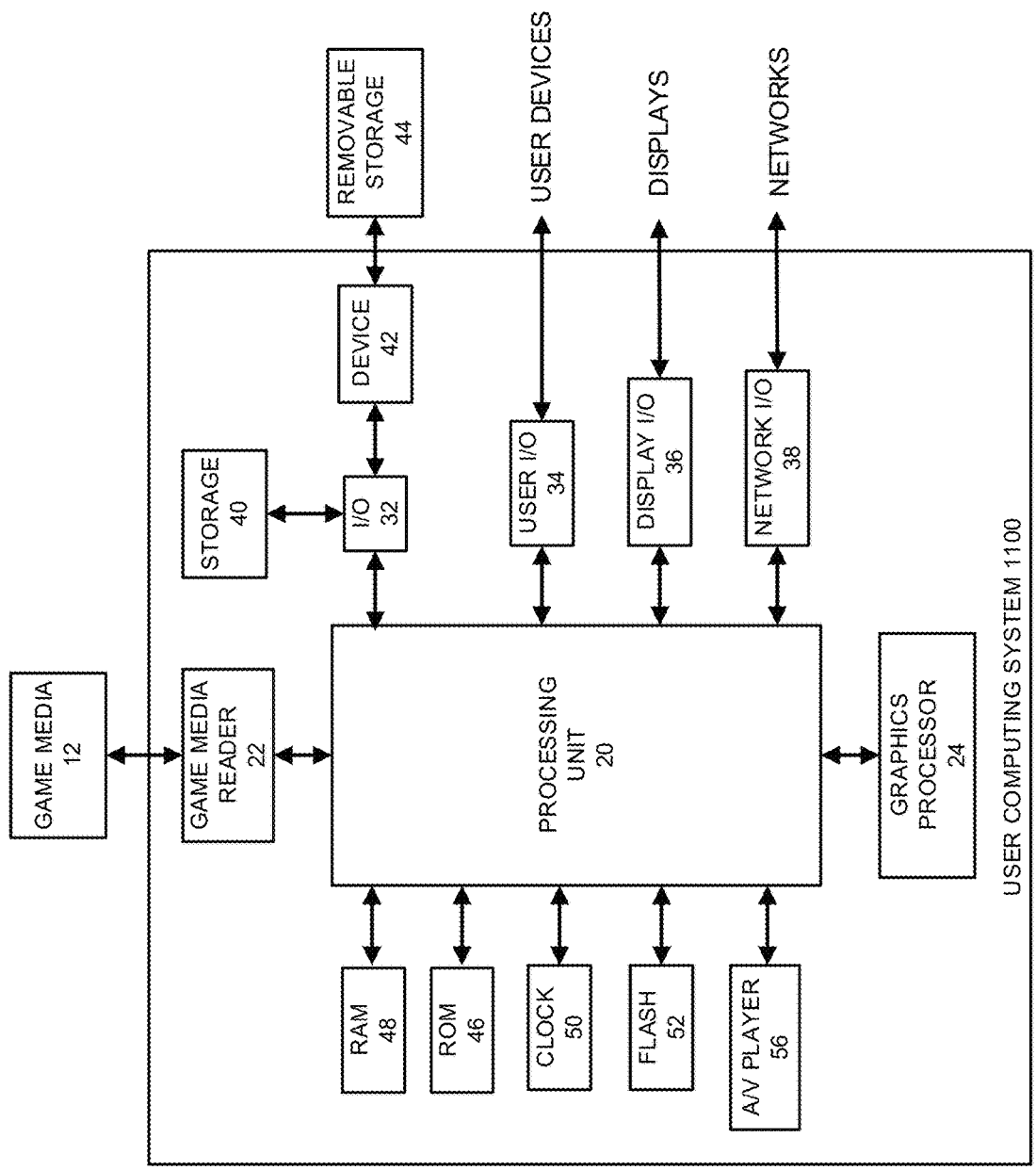
FIG. 11 illustrates an embodiment of a hardware configuration for a computing system usable with embodiments of the present disclosure.

FIG. 11 illustrates an embodiment of a hardware configuration for a computing system 1100 (e.g., issue tracking system 120 and/or the computing device used to run the user application 150 in FIG. 1A). Other variations of the computing system 1100 may be substituted for the examples explicitly presented herein, such as removing or adding components to the computing system 1100. The computing system 1100 may include a computer, a server, a smart phone, a tablet, a personal computer, a desktop, a laptop, a smart television, and the like.

As shown, the computing system 1100 includes a processing unit 20 that interacts with other components of the computing system 800 and also components external to the computing system 1100. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 1100 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 1100 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 1100 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the computing system 1100. The storage element 40 can store a database that includes the failure signatures, clusters, families, and groups of families. Processing unit 20 can communicate through I/O 32 to store data, such as game state data and any shared data files. In addition to storage 40 and removable storage media 44, the computing system 1100 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 800 on a display device, such as graphics, user interfaces, video, and/or other visual content. The computing system 1100 may comprise one or more integrated displays configured to receive display output signals produced by the display I/O 36, which may be output for display to a user. According to some embodiments, display output signals produced by the display I/O 36 may also be output to one or more display devices external to the computing system 1100.

The computing system 1100 can also include other features that may be used with a game, such as a clock 50, flash memory 52, and other components. An audio/video player 56 might also be used to play a video sequence, such as a movie. It should be understood that other components may be provided in the computing system 1100 and that a person skilled in the art will appreciate other variations of the computing system 1100.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 1100 is turned off or loses power.

As computing system 1100 reads game media 12 and provides a game, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method performed by an issue tracking system executing on a computing device, the computing device comprising at least one processor and memory, the memory storing computer-executable instructions that, when executed by the at least one processor, cause the issue tracking system to perform the method, the method comprising:

receiving, from a first computing system, a request to review a support identifier associated with a first recorded user session, wherein the first recorded user session includes interaction between a user application and a user over a period of time, wherein data associated with the first recorded user session is synchronized over the period of time and aggregately associated with the support identifier;

providing, to the first computing system, a user interface to display the first recorded user session; and outputting, to the first computing system, the data associated with the first recorded user session, wherein the data associated with the first recorded user session comprises, at least, decoded frame data identifying visible elements of the user application within the first recorded user session.

2. The method of claim 1, wherein the data associated with the first recorded user session comprises video data of an interaction between the user application and a user, wherein the video data captures the user application being interacted with by the user; and wherein the video data of the interaction comprises a plurality of frames, wherein the decoded frame data comprises a plurality of asset maps, wherein each asset map of the plurality of asset maps corresponds to a frame of the plurality of frames.

3. The method of claim 2, wherein the video data of the interaction comprises a plurality of frames, wherein the decoded frame data comprises a plurality of shader maps, and wherein each shader map of the plurality of shader maps corresponds to a frame of the plurality of frames.

4. The method of claim 1, wherein the visible elements identified by the decoded frame data include at least one of models rendered by the user application or pixels rendered by the user application.

5. The method of claim 1, wherein the data associated with the first recorded user session further comprising at least one of:
  overlay data comprising user markups or annotations provided by the user during the interaction;
  audio data of a user narration during the interaction;
  telemetry data generated by the user application during the interaction; or
  call stack data associated with execution of the user application during the interaction.

6. The method of claim 5, wherein the telemetry data comprises telemetry events.

7. The method of claim 5, wherein the telemetry data, the call stack data, and the decoded frame data are synchronized over the period of time via timestamps.

8. The method of claim 5, wherein the audio data of the user narration is from at least one of a webcam recording of the user or a microphone recording of the user.

9. The method of claim 5, wherein the audio data of the user narration comprises an audio transcript.

10. The method of claim 5, further comprising:
  generating data for the user interface, the user interface comprising:
    a video view configured to display the video data of the interaction;
    a user narration view configured to provide the audio data of the user narration, wherein the user narration view is synchronized to the video view; and
    toggle-able views of the overlay data, the telemetry data, the call stack data, and the decoded frame data, wherein the toggle-able views are synchronized to the video view.

11. The method of claim 10, wherein the video view further comprises a debug panel configured to display debug data associated with the decoded frame data.

12. The method of claim 10, wherein the video view further comprises session playback functionality configured for navigating playback of the first recorded user session.

13. The method of claim 1, wherein the issue tracking system is accessible by the first computing system over a network-based interface, and the user interface is a web-based interface accessible through browser software.

14. A system comprising:
  a processor; and
  a memory having instructions executable by the processor to cause the system to:
    receive, from a first computing system, a request to review a support identifier associated with a first recorded user session, wherein the first recorded user session includes interaction between a user application and a user over a period of time, wherein data associated with the first recorded user session is synchronized over the period of time and aggregately associated with the support identifier;
    provide, to the first computing system, a user interface to display the first recorded user session; and
    output, to the first computing system, the data associated with the first recorded user session, wherein the data associated with the first recorded user session comprises, at least, decoded frame data identifying visible elements of the user application within the first recorded user session.

15. The system of claim 14, wherein the data associated with the first recorded user session further comprising at least one of:
  video data of an interaction between the user application and a user, wherein the video data captures the user application being interacted with by the user;
  overlay data comprising user markups or annotations provided by the user during the interaction;
  audio data of a user narration during the interaction;
  telemetry data generated by the user application during the interaction; or
  call stack data associated with execution of the user application during the interaction.

16. The system of claim 15, the instructions executable by the processor are further configured to cause the system to:
  generate data for the user interface, the user interface comprising:
    a video view configured to display the video data of the interaction;
    a user narration view configured to provide the audio data of the user narration, wherein the user narration view is synchronized to the video view; and
    toggle-able views of the overlay data, the telemetry data, the call stack data, and the decoded frame data, wherein the toggle-able views are synchronized to the video view.

17. The system of claim 16, wherein the video view further comprises a debug panel configured to display debug data associated with the decoded frame data.

18. The system of claim 16, wherein the video view further comprises session playback functionality configured for navigating playback of the first recorded user session.

19. The system of claim 14, wherein the system is accessible by the first computing system over a network-based interface, and the user interface is a web-based interface accessible through browser software.

20. A non-transitory computer-readable storage medium comprising computer-executable instructions that, when executed by at least one processor, cause a computing system to perform a method, the method comprising: receiving, from a first computing system, a request to review a support identifier associated with a first recorded user session, wherein the first recorded user session includes interaction between a user application and a user over a period of time, wherein data associated with the first recorded user session is synchronized over the period of time and aggregately associated with the support identifier;
  providing, to the first computing system, a user interface to display the first recorded user session; and outputting, to the first computing system, the data associated with the first recorded user session, wherein the data associated with the first recorded user session comprises, at least, decoded frame data identifying visible elements of the user application within the first recorded user session.

* * * * *